(12) United States Patent
Wang et al.

(10) Patent No.: US 8,693,537 B2
(45) Date of Patent: Apr. 8, 2014

(54) REGION-OF-INTEREST CODING WITH BACKGROUND SKIPPING FOR VIDEO TELEPHONY

(75) Inventors: Haohong Wang, San Diego, CA (US); Khaled Helmi El-Maleh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1558 days.

(21) Appl. No.: 11/199,937

(22) Filed: Aug. 9, 2005

(65) Prior Publication Data

US 2006/0238445 A1 Oct. 26, 2006

Related U.S. Application Data

(60) Provisional application No. 60/658,008, filed on Mar. 1, 2005.

(51) Int. Cl.
 *H04N 7/12* (2006.01)
(52) U.S. Cl.
 USPC .................................................. 375/240.08
(58) Field of Classification Search
 USPC .................................................. 375/240.08
 See application file for complete search history.

(56) References Cited

U.S. PATENT DOCUMENTS

| | | | |
|---|---|---|---|
| 5,347,311 A | 9/1994 | Golin | |
| 5,815,601 A | 9/1998 | Katata et al. | |
| 5,881,176 A | 3/1999 | Keith et al. | |
| 5,978,515 A | 11/1999 | Katata et al. | |
| 6,088,061 A * | 7/2000 | Katata et al. | 348/390.1 |
| 6,111,991 A | 8/2000 | Ribas-Corbera et al. | |
| 6,256,423 B1 | 7/2001 | Krishnamurthy et al. | |
| 6,263,022 B1 | 7/2001 | Chen et al. | |
| 6,493,023 B1 | 12/2002 | Watson | |
| 6,633,367 B2 | 10/2003 | Gogolla | |
| 6,633,676 B1 | 10/2003 | Kleihorst et al. | |
| 6,879,723 B1 * | 4/2005 | Helman | 382/232 |
| 7,020,335 B1 | 3/2006 | Abousleman | |
| 7,085,425 B2 | 8/2006 | Christopoulos et al. | |
| 7,206,456 B2 | 4/2007 | Hannuksela et al. | |
| 7,277,484 B2 | 10/2007 | Kim et al. | |
| 2002/0122598 A1 * | 9/2002 | Ribas-Corbera et al. | 382/239 |
| 2003/0007558 A1 * | 1/2003 | Vetro et al. | 375/240.03 |

(Continued)

FOREIGN PATENT DOCUMENTS

| | | |
|---|---|---|
| EP | 0772362 A2 | 5/1997 |
| EP | 0866426 | 9/1998 |

(Continued)

OTHER PUBLICATIONS

Chung-Tao Chu, et al: "Bi-Directional Object-Based Coding in Video Compression at a Very Low Bitrate" Single Processing, 1996., 3rd International Conference on Beijing, China Oct. 14-18, 1996, New York, NY, USA, IEEE, US, vol. 2, Oct. 14, 1996, pp. 986-989.

(Continued)

*Primary Examiner* — Richard Torrente
(74) *Attorney, Agent, or Firm* — Kevin T. Cheatham

(57) ABSTRACT

The disclosure is directed to techniques for region-of-interest (ROI) coding for video telephony (VT). The disclosed techniques include adaptive skipping of non-ROI (i.e., background) areas to conserve encoding bits for allocation to the ROI.

18 Claims, 23 Drawing Sheets

(56) References Cited

U.S. PATENT DOCUMENTS

| | | | |
|---|---|---|---|
| 2003/0095598 | A1 | 5/2003 | Lee et al. |
| 2003/0118100 | A1* | 6/2003 | Honda et al. ............. 375/240.08 |
| 2004/0017850 | A1* | 1/2004 | Kim et al. ................ 375/240.01 |
| 2006/0204113 | A1 | 9/2006 | Wang et al. |
| 2006/0215766 | A1 | 9/2006 | Wang et al. |
| 2006/0238444 | A1 | 10/2006 | Wang et al. |
| 2006/0238445 | A1 | 10/2006 | Wang et al. |
| 2007/0076947 | A1 | 4/2007 | Wang et al. |
| 2007/0076957 | A1 | 4/2007 | Wang et al. |

FOREIGN PATENT DOCUMENTS

| | | |
|---|---|---|
| EP | 0892564 A2 | 1/1999 |
| EP | 1248470 A2 | 10/2002 |
| EP | 1315380 A2 | 5/2003 |
| GB | 2350515 A | 11/2000 |
| JP | 4290088 A | 10/1992 |
| JP | 04354489 | 12/1992 |
| JP | 6319134 A | 11/1994 |
| JP | 8251583 A | 9/1996 |
| JP | 11136674 A | 5/1999 |
| JP | 2000278683 A | 10/2000 |
| JP | 2001045485 | 2/2001 |
| JP | 2002508606 T | 3/2002 |
| JP | 2002185966 A | 6/2002 |
| JP | 2002525989 T | 8/2002 |
| JP | 2004194030 | 7/2004 |
| JP | 2008532428 | 8/2008 |
| WO | 9532565 A1 | 11/1995 |
| WO | 9811730 A1 | 3/1998 |
| WO | WO9949412 | 9/1999 |
| WO | 0018130 A1 | 3/2000 |
| WO | 0018134 A1 | 3/2000 |
| WO | WO0018067 | 3/2000 |
| WO | WO0018131 | 3/2000 |
| WO | WO0108134 | 2/2001 |
| WO | 02085038 A1 | 10/2002 |
| WO | 2004004359 A1 | 1/2004 |
| WO | 2004023819 A2 | 3/2004 |
| WO | WO2006094000 | 9/2006 |

OTHER PUBLICATIONS

He Z, et al: "A Linear Source Model and a Unified Rate Control Algorithm for DCT Video Coding". IEEE Transactions on Circuits and Systems for Video Technology, IEEE Service Center, Piscataway, NJ, US, vol. 12, No. 11, Nov. 2002, pp. 970-982.

Eeping Ong, et al: "Video Quality Metric for Low Bitrate Compressed Videos". Image Processing, 2004. ICIP '04. 2004 International Conference on Singapore Oct. 24-27, 2004, Piscataway, NJ, USA, IEEE, Oct. 24, 2004, pp. 3531-3534.

Written Opinion—PCT/US06/007156, International Search Authority—European Patent Office—Rijswijk—Sep. 1, 2007.

Xu and Hauske: "Picture Quality Evaluation Based on Error Segmentation", Proceedings of the Conference on Visual Communications and Image Processing '94, Chicago IL, USA, Sep. 25-28, 1994, vol. 2308, p. 1454-1465, SPIE—The International Society for Optical Engineering, USA, p. 1458-1459, para. 4, Fig. 1.

Minami and Zakhor: "An Optimization approach for removing blocking effects in transform coding", IEEE Trans. Circuits Systems for Video Technology, vol. 5, No. 2, p. 74-82, Apr. 1995, entire contents.

T.M. Cover et al.: "Elements of information theory", Wiley, New York, 1991, pp. 87-90, Chapter 5.

International Search Report—PCT/US06/007156, International Search Authority—European Patent Office—Rijswijk—Oct. 11, 2006.

Interface. CQ Publications Co. Ltd. Aug. 1, 1992, vol. 18, No. 8, pp. 149-151.

Translation of Office Action in Japan application 2007-558150 corresponding to U.S. Appl. No. 11/199,937, citing JP8251583A and JP4354489 dated Jan. 25, 2011.

Translation of Office Action in Japanese application 2007-558149 corresponding to U.S. Appl. No. 11/199,937, citing WO99/49412, JP2002508606, JP2002525989, JP8251583, JP2004194030 and JP2001045485 dated Jan. 25, 2011.

"Meaning of NUMBER—an English-Japanese dictionary Weblio", [online], [retrieval on Aug. 29, 2011], Internet <URL:http://ejje.weblio.jp/content/NUMBER>.

Pietrowcew, A., et al.,"Bit-Rate Control Algorithm for ROI Enabled Video Coding," Computer Analysis of Images and Patterns, Lecture Notes in Computer Science, Jan. 2005, vol. 3691, pp. 514-521.

Sakaida, Shinichi et al., "Adaptive Quantization Control for Reducing Flicker of AVC/H.264 Infra Frames," Information Technology Letters of 3rd Forum on Information Technology of the Institute of Electronics, Information and Communication Engineers, Japan, Aug. 20, 2004, vol. 3, pp. 225-227.

Adiono T. et al., "Face Focus Coding Under H.263+Video Coding Standard", in Proc. IEEE Asia-Pacific Conf Circuits and Systems, Dec. 2000, Tianjin, China, pp. 461-464.

Chai, at al.: "Face Segmentation Using Skin-Color Map in Videophone Applications," IEEE Transactions on Circuits and Systems for Video Technology, vol. 9, No. 4 (Jun. 1999), pp. 551-564, XP011014577. ISSN:1051-8215.

Chen M. et al., "ROI Video Coding Based on H.263+with Robust Skin-Color Detection Technique", IEEE Trans. Consumer Electronics, vol. 49, No. 3, Aug. 2003. pp. 724-730.

Daly, et al, Face-based visually-optimized image sequence coding, ICIP 1998, vol. 3, pp. 443-447.

Daly S. et al., "As Plain as the Noise on Your Face: Adaptive Video Compression Using Face Detection and Visual Eccentricity Models", Journal of Electronic Imaging, 10(1), Jan. 2001, pp. 30-46.

Eleftheriadis A. et al., "Automatic Face Location Detection and Tracking for Model-Assisted Coding of Video Teleconferencing Sequences at Low Bit-Rates", Signal Processing: Image Communications, vol. 7, No. 4-6, pp. 231-248, Nov. 1995.

E.Y. Lam, et al: "A mathematical analysis of the DCT coefficient distributions for images", IEEE Transactoins on Image Processing, vol. 9, No. 10, Oct. 2000.

H. Wang, et al: "Rate-distortion optimal bit allocation scheme for object-based video coding", IEEE Transactions on Circuits and Systems for Video Technology, vol. 15, No. 9, Sep. 2005.

Lee J. et al., "Spatial-Temporal Model Assisted Compatible Coding for Low and Very Low Bitrate Video Telephony", in Proc. IEEE Int. Conf. Image Proc., vol. 2, pp. 429-432, Lausanne, Switzerland, Sep. 1996.

Lin C. et al., "A Low-Complexity Face-Assisted Coding Scheme for Low Bit-Rate Video Telephony", IEICE Trans. Inf. & Syst., vol. E86-D, No. 1, Jan. 2003. pp. 101-108.

Ribas-Corbera, et al, Rate control in DCT video coding for low-delay communications, IEEE Trans. Circuits Systems for Video Technology, 1999, 9(1):172-185.

Sengupta S. et al., "Perceptually Motivated Bit-Allocation for H.264 Encoded Video Sequences", ICIP'03, vol. III, pp. 797-800.

Tancharoen D. et al.,"Automatic Face Color Segmentation Based Rate Control for Low Bit-Rate Video Coding", in Proc. 2003 International Symposium on Circuits and Systems (ISCAS'03), vol. II, pp. 384-387.

Wong, et al., Perceptual rate control for low-delay video communications, ICME 2003, 203, vol. III, pp. 361-364.

Yang X. K. et al., "Local Visual Perceptual Clues and its Use in Videophone Rate Control", ISCAS'2004, vol. III, pp. 805-808.

Lee, Jeong-Woo, et al. "Bit Allocation for MPEG-4 Video Coding With Spatio-Temporal Tradeoffs". IEEE Jun. 2003. pp. 488-502.

European Search Report—EP08020959 —Search Authority—Munich—Jun. 24, 2013.

European Search Report—EP08020959—Search Authority—Munich—Sep. 19, 2013.

* cited by examiner

REGION-OF-INTEREST CODING WITH BACKGROUND SKIPPING FOR VIDEO TELEPHONY

This application claims the benefit of U.S. Provisional Application No. 60/658,008, filed Mar. 1, 2005.

TECHNICAL FIELD

The disclosure relates to digital video encoding and, more particularly, techniques for encoding region-of-interest (ROI) information for video telephony (VT) applications.

BACKGROUND

A number of different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU) H.263 standard, and the emerging ITU H.264 standard. These video encoding standards generally support improved transmission efficiency of video sequences by encoding data in a compressed manner.

Video telephony (VT) permits users to share video and audio information to support applications such as videoconferencing. Exemplary video telephony standards include those defined by the Session Initiation Protocol (SIP), the ITU H.323 standard, and the ITU H.324 standard. In a VT system, users may send and receive video information, only receive video information, or only send video information. A recipient generally views received video information in the form in which it is transmitted from a sender.

Preferential encoding of a selected portion of the video information has been proposed. For example, a sender may specify a region-of-interest (ROI) to be encoded with higher quality for transmission to a recipient. The sender may wish to emphasize the ROI to a remote recipient. A typical example of an ROI is a human face, although a sender may wish to focus attention on other objects within a video scene. With preferential encoding of the ROI, a recipient is able to view the ROI more clearly than non-ROI regions.

SUMMARY

The disclosure is directed to techniques for region-of-interest (ROI) coding for video telephony (VT). The disclosed techniques include a technique for adaptive skipping of a non-ROI area of a video frame to conserve encoding bits for allocation to the ROI. The disclosed techniques also include a technique for allocation of bits to the ROI using weighted bit allocation models at the macroblock (MB) level within the $\rho$ domain. In addition, the disclosed techniques include a technique for generation of a quality metric for ROI video, which jointly considers a user's degree of interest in the ROI, ROI video fidelity, and ROI perceptual quality in evaluating the quality of an encoded video sequence.

The non-ROI skipping technique serves to enhance image quality of the ROI without significantly degrading the image quality of the non-ROI region. In particular, the non-ROI skipping technique can conserve non-ROI bits to provide additional bits for allocation to the ROI. The quality metric may be applied to bias the bit allocation technique to enhance subjective image quality in the encoded video scene. Bit allocation in the $\rho$ domain can provide more accurate and consistent control of ROI quantization for enhanced visual quality. The non-ROI skipping, $\rho$ domain bit allocation, and quality metric can be used jointly or separately to achieve effective control of ROI and non-ROI encoding.

In one embodiment, the disclosure provides a method comprising generating a quality metric for an encoded video frame containing a region of interest based on video fidelity of a preceding frame, perceptual quality of the preceding frame, and user preference in the region of interest.

In another embodiment, the disclosure provides a device comprising a video encoder that encodes a video frame containing a region of interest, and a quality metric calculator that generates a quality metric for the video frame based on video fidelity of a preceding frame, perceptual quality of a preceding frame, and user preference in the region of interest.

In a further embodiment, the disclosure provides a method comprising obtaining a definition of a region of interest within a video frame, obtaining a frame budget defining a number of encoding bits available for the frame, and allocating rho domain values to macroblocks within the frame based on the frame budget and a weighting between macroblocks within the region of interest and macroblocks within areas of the video frame that are not within the region of interest.

In an additional embodiment, the disclosure provides a device comprising a region of interest mapper that generates a definition of a region of interest within a video frame, a frame-level rate controller that generates a frame budget defining a number of encoding bits available for the frame, and a bit allocation module that allocates rho domain values to macroblocks within the frame based on the frame budget and a weighting between macroblocks within the region of interest and macroblocks within areas of the video frame that are not within the region of interest.

In another embodiment, the disclosure provides a method comprising grouping successive frames into a frame unit, encoding regions of interest within the respective frames in the frame unit, and skipping encoding of areas that are not within a respective region of interest for at least one of the frames in the frame unit.

In a further embodiment, the disclosure provides a device comprising a region-of-interest mapper that generates a definition of regions of interests within video frames, a video encoder that encodes the video frames, and a skipping module that groups successive frames into a frame unit, directs the video encoder to encode regions of interest within the respective frames in the frame unit, and directs the video encoder to skip encoding of areas that are not within a respective region of interest for at least one of the frames in the frame unit.

The techniques described herein may be implemented in hardware, software, firmware, or any combination thereof. If implemented in software, the techniques may be realized in part by a computer readable medium comprising program code containing instructions that, when executed, performs one or more of the methods described herein.

The details of one or more embodiments are set forth in the accompanying drawings and the description below. Other features, objects, and advantages will be apparent from the description and drawings, and from the claims.

DETAILED DESCRIPTION

Figure 1:
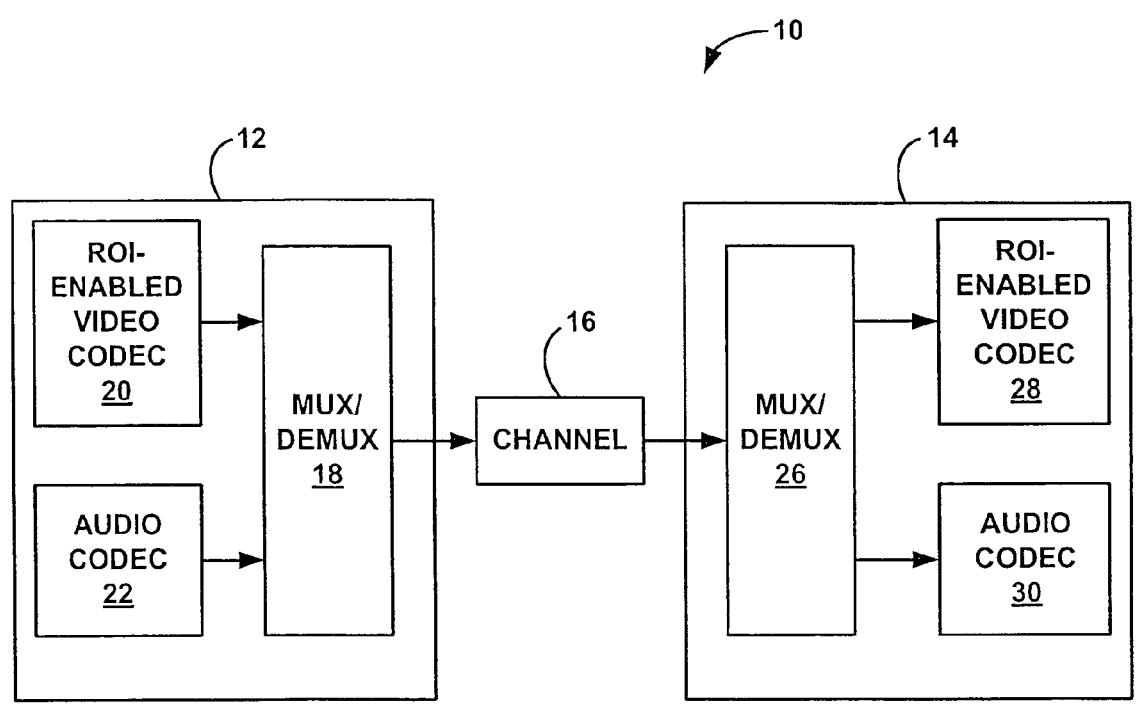
FIG. 1 is a block diagram illustrating a video encoding and decoding system incorporating ROI-enabled video encoder-decoders (CODECs).

FIG. 1 is a block diagram illustrating a video encoding and decoding system 10 incorporating ROI-enabled video encoder-decoders (CODECs). As shown in FIG. 1, system 10 includes a first video communication device 12 and a second video communication device 14. Communication devices 12, 14 are connected by a transmission channel 16. Transmission channel 16 may be a wired or wireless communication medium. System 10 supports two-way video transmission between video communication devices 12, 14 for video telephony. Devices 12, 14 may operate in a substantially symmetrical manner. In some embodiments, however, one or both video communication devices 12, 14 may be configured for only one-way communication to support ROI-enabled video streaming.

One or both of video communication devices 12, 14 may be configured to apply techniques for ROI coding for video telephony (VT), as described herein. The ROI coding techniques including adaptive skipping of a non-ROI region to conserve encoding bits for allocation to the ROI, allocation of bits to the ROI using weighted bit allocation models at the video block level, e.g., macroblock (MB), level within the ρ domain, and generation of an ROI video quality metric for ROI video, which jointly considers a user's degree of interest in the ROI, ROI video fidelity, and ROI perceptual quality in evaluating the quality of an encoded video sequence. The ρ (rho) parameter represents the number of non-zero AC coefficients in a video block, such as an MB. Rate control in the ρ domain tends to be more accurate than rate control in the QP domain. The non-ROI skipping, ρ domain bit allocation, and quality metric can be used jointly or separately to achieve effective control of ROI and non-ROI encoding.

A macroblock is a video block that forms part of a frame. The size of the MB may be 16 by 16 pixels. However, other MB sizes are possible. Macroblocks will be described herein for purposes of illustration, with the understanding that macroblocks or other video blocks may have a variety of different sizes.

For two-way applications, reciprocal encoding, decoding, multiplexing (MUX) and demultiplexing (DEMUX) components may be provided on opposite ends of channel 16. In the example of FIG. 1, video communication device 12 includes MUX/DEMUX component 18, ROI-enabled video CODEC 20 and audio CODEC 22. Similarly, video communication device 14 includes MUX/DEMUX component 26, ROI-enabled video CODEC 28 and audio CODEC 30.

System 10 may support video telephony according to the Session Initiated Protocol (SIP), ITU H.323 standard, ITU H.324 standard, or other standards. Each video CODEC 20, 28 generates encoded video data according to a video compression standard, such as MPEG-2, MPEG-4, ITU H.263, or ITU H.264. As further shown in FIG. 1, video CODECs 20, 28 may be integrated with respective audio CODECs 22, 30, and include appropriate MUX/DEMUX components 18, 26 to handle audio and video portions of a data stream. The audio portion may carry voice or other audio content. The MUX-DEMUX units 18, 26 may conform to the ITU H.223 multiplexer protocol, or other protocols such as the user datagram protocol (UDP).

Each ROI-enabled video CODEC 20, 28 may be capable of processing ROI information provided locally by a local user of the respective video communication device 12, 14 or ROI information provided remotely from a remote user of the other video communication device 12, 14. For example, a local user of video communication device 12 may specify an ROI in "near-end" video generated locally by video communication device 12 to emphasize a region of the transmitted video to a remote user of device 14. Conversely, a local user of video communication device 12 may specify an ROI in "far-end" video generated remotely by video communication device 14, and communicate the ROI to the remote video communication device. In this case, the user of video communication device 12 remotely controls preferential encoding of the ROI by video communication device 14, e.g., to more clearly view an ROI in the video received from video communication device 14.

Video communication devices 12, 14 may be implemented as wireless mobile terminals or wired terminals equipped for video streaming, video telephony, or both. To that end, video communication devices 12, 14 may further include appropriate wireless transmitter, receiver, modem, and processing electronics to support wireless communication. Examples of wireless mobile terminals include mobile radio telephones, mobile personal digital assistants (PDAs), mobile computers, or other mobile devices equipped with wireless communication capabilities and video encoding and/or decoding capabilities. Examples of wired terminals include desktop computers, video telephones, network appliances, set-top boxes, interactive televisions, or the like. Either video communication device 12, 14 may be configured to send video information, receive video information, or send and receive video information.

For video telephony applications, it is generally desirable that devices 12 support both video send and video receive capabilities. However, streaming video applications are also contemplated. In video telephony, and particularly mobile video telephony by wireless communication, bandwidth is a significant concern as extremely low bitrates are often required. In particular, communication channel 16 may have limited bandwidth, making the effective real-time transmission of quality video sequences over channel 16 very challenging. Communication channel 16, for example, may be a wireless communication link with limited bandwidth due to physical constraints in channel 16, or possibly quality-of-service (QoS) limitations or bandwidth allocation constraints imposed by the provider of communication channel 16.

Accordingly, selective allocation of additional encoding bits to an ROI, stronger error protection, or other preferential encoding steps, can improve the image quality of a portion of the video while maintaining overall encoding efficiency. For preferential encoding, additional bits may be allocated to the ROI, while a reduced number of bits may be allocated to the non-ROI regions, such as the background in a video scene. The non-ROI areas will be referred to as "background" areas, although a non-ROI area more generally encompasses any area of a video scene that does not form part of the ROI. Accordingly, the terms non-ROI and background may be used interchangeably throughout this disclosure to refer to areas that are not within the specified ROI.

In general, system 10 employs techniques for region-of-interest (ROI) processing for video telephony (VT) applications. However, such techniques also may be applicable to video streaming applications, as mentioned above. For purposes of illustration, it will be assumed that each video communication device 12, 14 is capable of operating as both a sender and a recipient of video information, and thereby operating as a fill participant in a VT session. For video information transmitted from video communication device 12 to video communication device 14, video communication device 12 is the sender device and video communication device 14 is the recipient device. Conversely, for video information transmitted from video communication device 14 to video communication device 12, video communication device 12 is the recipient device and video communication device 14 is the sender device. The techniques described herein may also be applicable to devices that only send or only receive such video. When discussing video information to be encoded and transmitted by a local video communication device 12, 14, the video information may be referred to as "near-end" video, as mentioned above. When discussing video information to be encoded by and received from a remote video communication device 12, 14, the video information may be referred to as "far-end" video.

According to the disclosed techniques, when operating as a recipient device, video communication device 12 or 14 defines ROI information for far-end video information that is received from a sender device. Again, video information that is received from a sender device will be referred to as "far-end" video information in the sense that it is received from the other (sender) device situated at the far end of the communication channel. Likewise, ROI information defined for video information that is received from a sender device will be referred to as "far-end" ROI information. Far-end ROI generally refers to a region within the far-end video that most interests a receiver of the far-end video. The recipient device decodes the far-end video information and presents the decoded far-end video to a user via a display device. The user selects an ROI within a video scene presented by the far-end video. Alternatively, the ROI may be automatically defined.

The recipient device generates far-end ROI information based on the ROI selected by the user at the recipient device, and sends the far-end ROI information to the sender device so that the sender device can use such information. The far-end ROI information may take the form of an ROI macroblock (MB) map defining the ROI in terms of the MBs that reside within the ROI. The ROI MB map may flag MBs that are within the ROI with a 1, and MBs outside the ROI with a 0, to readily identify MBs included in (1) and excluded from (0) the ROI.

Using the far-end ROI information transmitted by the recipient device, the sender device applies preferential encoding to a corresponding ROI within the video scene. In particular, additional encoding bits may be allocated to the ROI, while a reduced amount of encoding bits may be allocated to non-ROI regions, thereby improving image quality of the ROI. In this manner, the recipient device is able to remotely control ROI encoding of far-end video information by the sender device.

The preferential encoding applies higher quality encoding to the ROI area than to non-ROI areas of the video scene, e.g., by preferential bit allocation or preferential quantization in the ROI area. The preferentially encoded ROI permits the user of the recipient device to view an object or region more clearly. For example, the user of the recipient device may wish to view a face or some other object more clearly than background regions of a video scene.

When operating as a sender device, video communication device 12 or 14 may also define ROI information for video information that is transmitted by the sender device. Again, video information that is generated in the sender device will be referred to as "near-end" video in the sense that it is generated at the near end of the communication channel. ROI information generated by the sender device will be referred to as "near-end" ROI information.

Near-end ROI generally refers to a region of the near-end video that a sender wants to emphasize to a receiver. Hence, an ROI may be specified by a recipient device user as far-end ROI information, or by a sender device user as near-end ROI information. The sender device presents the near-end video to a user via a display device. The user associated with the sender device selects an ROI within a video scene presented by the near-end video. The sender device encodes the near-end video using the user-selected ROI such that the ROI in the near-end video is preferentially encoded, e.g., with higher quality encoding, relative to non-ROI areas.

The near-end ROI selected or defined by a local user at the sender device allows a user of the sender device to emphasize regions or objects within the video scene, and thereby direct such regions or objects to the attention of the recipient device user. Notably, the near-end ROI selected by the sender device user need not be transmitted to the recipient device. Instead, the sender device uses the selected near-end ROI information to locally encode the near-end video before it is transmitted to the recipient device. In some embodiments, however, the sender device may send ROI information to the recipient device to permit application of preferential decoding techniques, such as higher quality error correction or post-processing.

If ROI information is provided by both the sender device and the recipient device, the sender device applies the received far-end ROI information from the recipient device or the locally generated near-end ROI information to encode the near-end video. ROI conflicts may arise between the near-end and far-end ROI selections provided by the sender device and recipient device. Such conflicts may require resolution, such as active resolution by a local user or resolution according to specified access rights and levels. In either case, the sender device preferentially encodes the ROI based on near-end ROI information provided locally by the sender device or remotely by the recipient device.

Given an ROI specified by either a local user or a remote user, this disclosure generally focuses on techniques for ROI encoding. In particular, this disclosure addresses the manner in which an ROI is preferentially encoded, in terms of bit allocation between ROI and non-ROI areas within a video scene. An ROI video quality metric may be applied to bias a weighted bit allocation between ROI and non-ROI areas. The video quality metric takes into account a user's degree of preference, i.e., interest in the ROI, ROI video fidelity, and ROI perceptual quality in evaluating the quality of an encoded video sequence. The weighted bit allocation is applied within the $\rho$ domain. In addition, a non-ROI, or "background," skipping algorithm may be applied to conserve encoding bits for allocation to the ROI.

Figure 2:
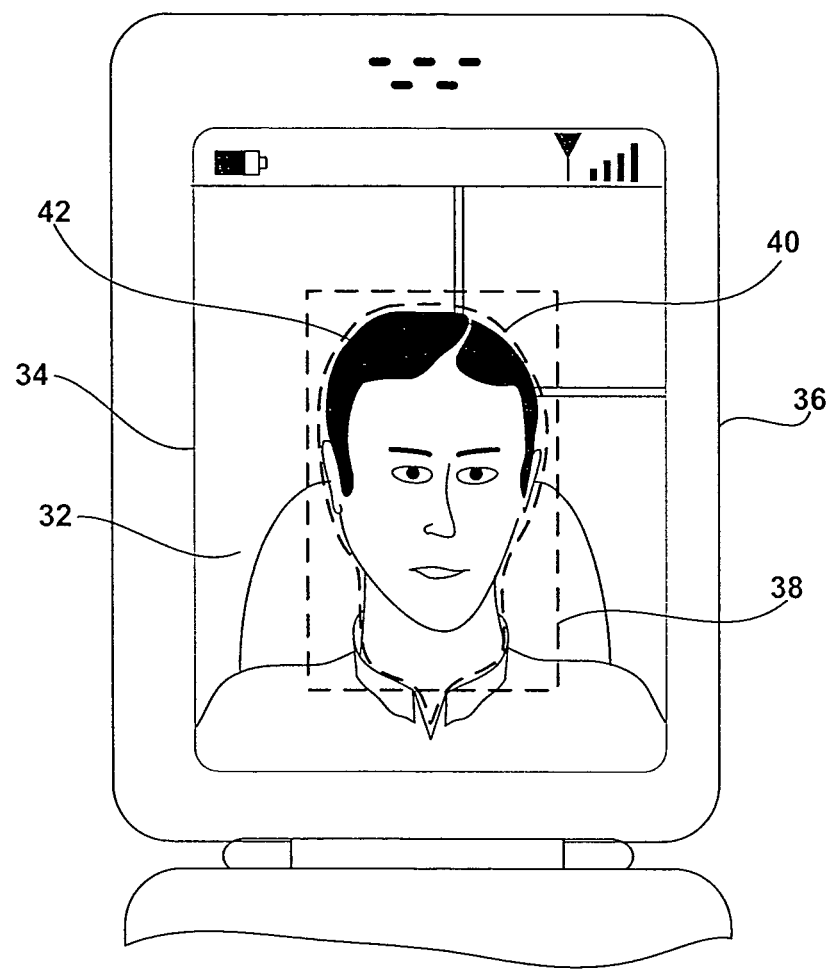
FIG. 2 is a diagram illustrating definition of an ROI within a video scene presented on a display associated with a wireless communication device.
Figure 3A:
FIGS. 3A and 3B are diagrams illustrating ROI and non-ROI areas of the video scene depicted in FIG. 2.
Figure 3B:
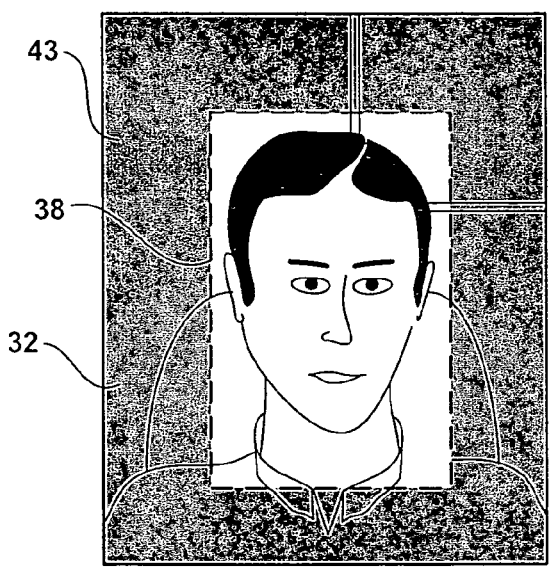

FIG. 2 is a diagram illustrating definition of an ROI within a video scene 32 presented on a display 34 associated with a wireless communication device 36. In the example of FIG. 2, the ROI is depicted as either a rectangular ROI 38 or a non-rectangular ROI 40. Non-rectangular ROI 40 may have a rounded or irregular shape. In each case, ROI 38 or ROI 40 contains the face 42 of a person presented in video scene 32. FIGS. 3A and 3B are diagrams illustrating ROI 38 and non-ROI area 43 of the video scene 32 depicted in FIG. 2. The non-ROI area 43, i.e., the background, is highlighted by shading in FIG. 3B.

ROI 38 or 40 may be defined manually by a user, automatically by device 36, or using a combination of manual ROI description by a user and automatic ROI definition by device 36. Rectangular ROI 38 may be selected by a user. Non-rectangular ROI 40 may be drawn by a user, e.g., using a stylus and a touchscreen, or selected automatically by device 36 using any of a variety of object detection or segmentation techniques. For VT applications, ROI 38 or 40 may encompass a portion of video scene 32 that contains the face 42 of a participant in a videoconference. The size, shape and position of ROI 38 or 40 may be fixed or adjustable, and may be defined, described or adjusted in a variety of ways.

ROI 38 or 40 permits a video sender to emphasize individual objects within a transmitted video scene 32, such as the face 42 of a person. Conversely, ROI 38 or 40 permits a video recipient to more clearly view desired objects within a received video scene 32. In either case, face 42 within ROI 38 or 40 is encoded with higher image quality relative to non-ROI areas such as background regions of video scene 32. In this way, the user is able to more clearly view facial expressions, lip movement, eye movement, and the like.

ROI 38 or 40 may be used, however, to specify objects other than the face. Generally speaking, the ROI in VT applications can be very subjective and may differ from user to user. The desired ROI also depends on how VT is used. In some cases, VT may be used to view and evaluate objects, in contrast to videoconferencing. For example, a user may wish to focus on a section of a whiteboard containing equations or drawings, rather than a presenter's face, particularly when the presenting is facing away from the camera and toward the whiteboard. In some cases, a video scene may include two or more ROI's, which are designated for preferential encoding.

Figure 4:
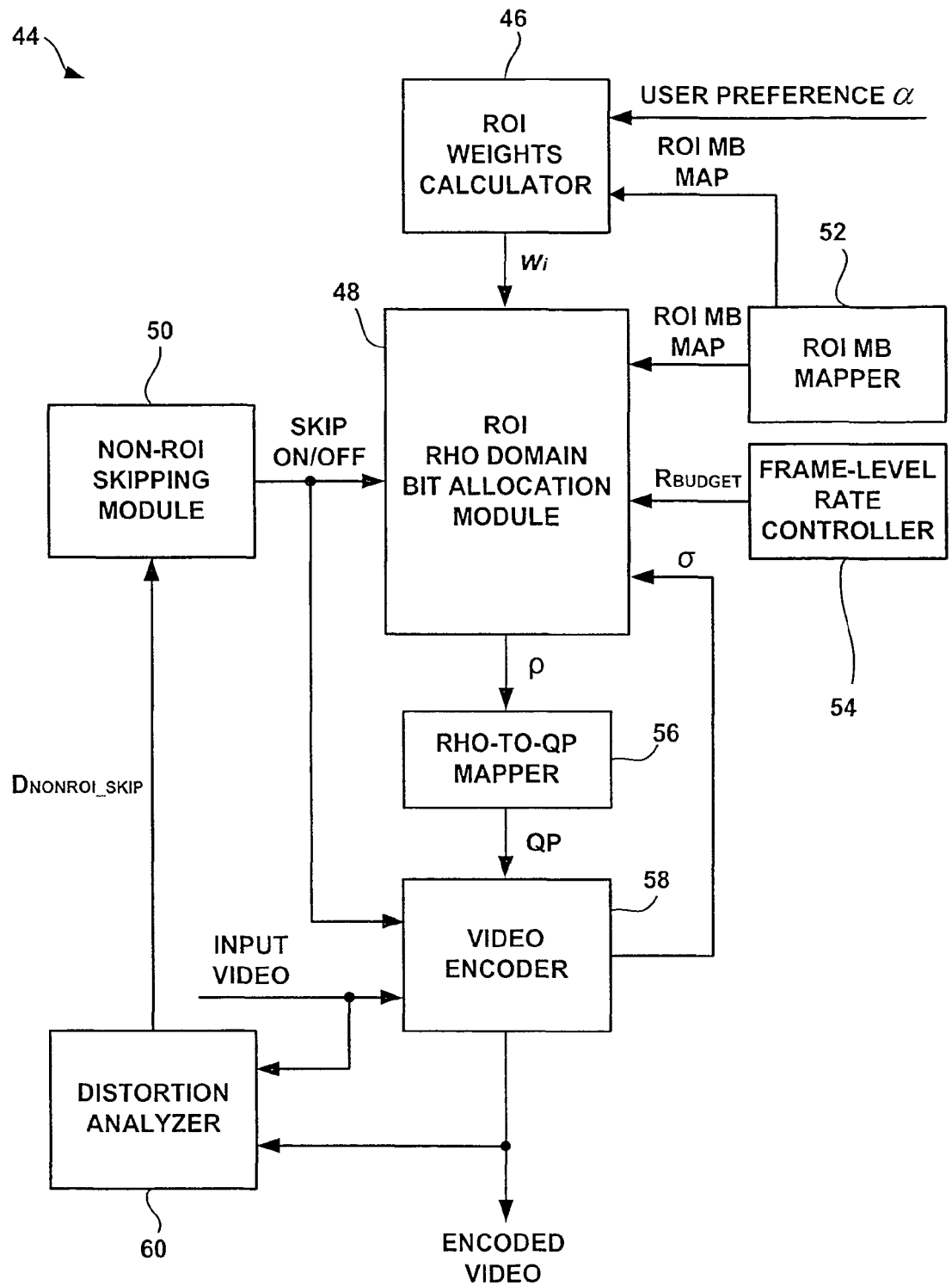
FIG. 4 is a block diagram illustrating a video communication device incorporating an ROI-enabled encoder with a non-ROI skipping module, an ROI ρ domain bit allocation module, and an ROI weights calculator.

FIG. 4 is a block diagram illustrating an ROI-enabled video encoding system 44 for use in a video communication device 12. As shown in FIG. 4, system 44 includes ROI weights calculator 46, ROI $\rho$ domain bit allocation module 48, non-ROI (i.e., background) skipping module 50, ROI macroblock (MB) mapper 52, frame-level rate controller 54, $\rho$-to-quantization parameter (QP) mapper 56, video encoder 58, and distortion analyzer 60. In FIG. 4, MUX-DEMUX and audio components are omitted for ease of illustration.

The various components depicted in FIG. 4 may be formed in a variety of ways, as discrete functional modules or as a monolithic module that encompasses the functionality ascribed to each module. In any event, the various components of video encoding system 44 may be realized in hardware, software, firmware, or a combination thereof. For example, such components may operate as software processes executing on one or more microprocessors or digital signal processors (DSPs), one or more application specific integrated circuits (ASICs), one or more field programmable gate arrays (FPGAs), or other equivalent integrated or discrete logic circuitry.

In the example of FIG. 4, ROI weights calculator 46 receives user preference factor α entered by a local user of video communication device 12 or a remote user of video communication device 14. The user preference α is a perceptual importance factor for the ROI, which expresses the importance of visual quality of the ROI form the perspective of the actual user. User preference α quantifies the degree to which a user values visual quality within the ROI. If the user strongly values ROI visual quality, a will be higher. If the visual quality of the ROI is less important, a will be lower. Based on preference α, ROI weights calculator 46 generates a set of weights $w_i$ that are applied to ROI ρ domain bit allocation module 48 to bias the weighted bit allocation between non-ROI and ROI areas of a video frame being encoded by video encoder 58. The weights $w_i$ may be designated for individual video blocks, such as macroblocks (MBs), within a video frame. ROI weights calculator 46 receives an ROI MB map from ROI MB mapper 52, and assigns respective weights $w_i$ to ROI and non-ROI MBs identified by ROI MB mapper 52. Macroblocks with higher weights $w_i$ will receive a higher number of coding bits.

The ρ domain bit allocation module 48 receives the weights input $w_i$ from ROI weights calculator 46, a skipping indication (SKIP ON/OFF) from non-ROI background skipping module 50, an ROI MB map from ROI MB mapper 52, a rate budget $R_{BUDGET}$ from frame-level rate controller 54, and a standard deviation σ for the encoded MBs from video encoder 58. The standard deviation σ may be the standard deviation of the actual residue obtained after motion estimation, and can be the stored residue statistics from previous frames. The ROI MB map provided by ROI MB mapper 52 identifies the MBs, within a given video frame, that fall within the specified ROI. Using the ROI MB map, the ρ domain bit allocation module 48 distinguishes ROI MBs from non-ROI MBs for purposes of preferential bit allocation to the ROI MBs, i.e., using the weights $w_i$ provided by ROI weights calculator 46. Bit allocation module 48 generates a ρ parameter for each MB. The ρ parameter represents the number of non-zero AC coefficients in an MB. Rate control in the ρ domain tends to be more accurate than rate control in the QP domain.

For purposes of this disclosure, it is assumed that a suitable process for generation of the ROI MB map is available. For example, the ROI mapping process may be based on manual input from a user defining the ROI, or automatic definition or detection of the ROI, e.g., using conventional techniques such as face detection, face segmentation, and target tracking with acceptable accuracy. In this disclosure, for purposes of illustration, head or head-and-shoulder video sequences are considered, although the techniques described herein may be applicable to other types of video sequences containing a variety of objects in addition, or as an alternative, to persons.

Frame-level rate controller 54 generates an allocation of bits to individual frames within a video sequence. In particular, frame-level rate controller 54 generates a value $R_{BUDGET}$ that indicates the number of bits available for encoding all of the MBs within the present frame, i.e., both ROI and non-ROI MBs. As further shown in FIG. 4, ρ domain bit allocation module 48 receives a skip indication (SKIP ON/OFF) from non-ROI background skipping module 50, which indicates whether the background in the present frame will be encoded or skipped. If the background will be skipped, then ρ domain bit allocation module 48 can, in effect, recapture the bits that would otherwise have been allocated to the non-ROI, and reallocate them to the pool of bits available to encode the ROI. Hence, if skipping is ON in a particular frame, ρ domain bit allocation module 48 has more bits within $R_{BUDGET}$ to allocate to the ROI. If the background is skipped in a particular frame, background from a previously encoded frame may be substituted in its place. Alternatively, the skipped background may be produced by interpolation.

Using the weights $w_i$, ROI MB map, $R_{BUDGET}$, SKIP ON/OFF indication, and standard deviation σ, ρ domain bit allocation module 48 generates a ρ domain output indicating the ρ budget for each MB. The ρ domain output is applied to ρ-to-QP mapper 56, which maps the ρ value to a corresponding QP value for each MB. Using the QP values for the MBs within the frame, video encoder 58 encodes input video to produce encoded video. In addition, skipping module 50 provides a skip indication (SKIP ON/OFF) to video encoder 58 to direct the video encoder to group successive frames into a frame unit, encode ROI areas of the frames, and skip encoding of non-ROI areas for one of the frames within the frame unit. Skipping may be adaptive in the sense that skipping module 50 may direct video encoder 58 to skip encoding of the non-ROI areas for one of the frames in the frame unit if a distortion value associated with a preceding frame unit is less than a threshold value. In this manner, skipping module 50 may apply adaptive skipping based on the level of distortion in order to maintain visual quality.

The input video may be obtained from a video capture device, such as a video camera integrated with, or operably coupled to, video communication device 12. In some embodiments, for example, the video capture device may be integrated with a mobile telephone to form a so-called camera phone or video phone. In this manner, video capture device 40 may support mobile VT applications. The video may be presented both locally on video communication device 12 and, upon transmission, on video communication device 14 via a display device, such as a liquid crystal display (LCD), a plasma screen, or the like, which may be integrated with, or operably coupled to, video communication device 12 or 14.

Distortion analyzer 60 analyzes the encoded video versus the original input video. For example, distortion analyzer 60 compares an original input video frame F to a reconstructed video frame F'. Distortion analyzer 60 generates a distortion value $D_{NONROI\_SKIP}$ for application to non-ROI background skipping module 50. The distortion value $D_{NONROI\_SKIP}$ indicates whether the non-ROI area of the next video frame should be skipped or not. Accordingly, for adaptive non-ROI skipping in a current frame, non-ROI skipping module 50 may generally rely on distortion information relating to a preceding frame, or frame unit containing two or more frames.

If the distortion value $D_{NONROI\_SKIP}$ exceeds a desired threshold, non-ROI background skipping module 50 indicates that the non-ROI in the next frame should not be skipped. In this case, the ROI and non-ROI areas are both encoded. If the distortion value is less than the desired threshold, however, the non-ROI area can be skipped without an undue level of distortion. In this case, the non-ROI area encoded for the previous frame is used in the present frame. As will be described, non-ROI skipping module 50 may group successive frames into frame units and direct video encoder 58 to skip encoding of the non-ROI for one of the frames, depending on the distortion value $D_{NONROI\_SKIP}$ for a preceding fame unit, i.e., a frame unit containing frames that precede the frames presently being encoded.

Figure 5:
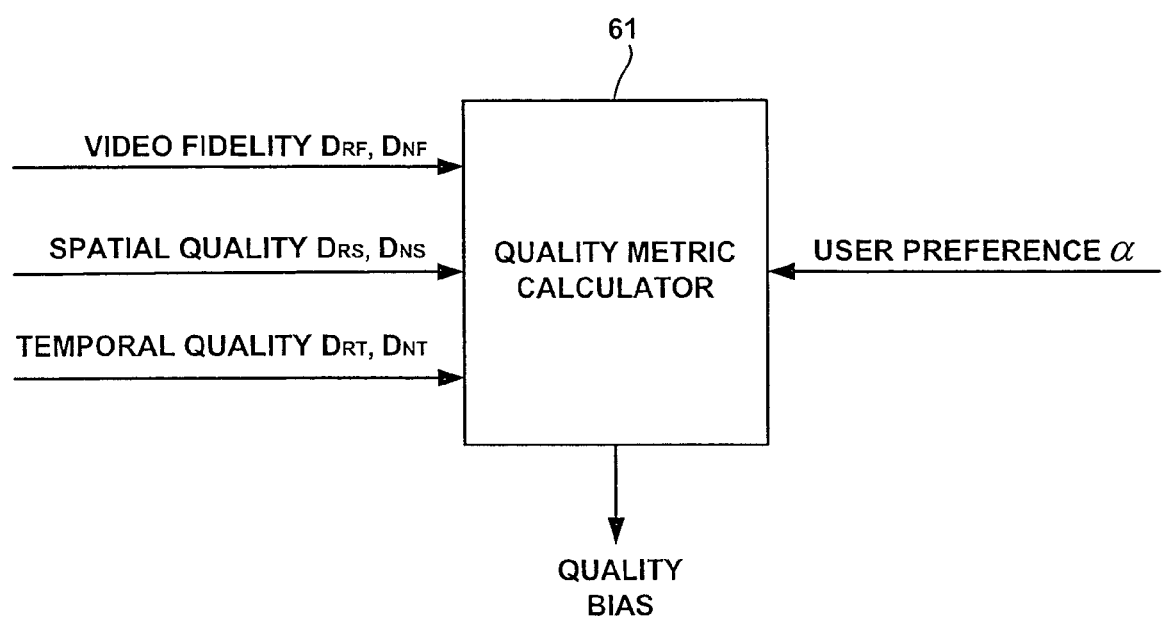
FIG. 5 is a block diagram illustrating an ROI quality metric calculator.

FIG. 5 is a block diagram illustrating an ROI quality metric calculator 61, in accordance with another embodiment of this disclosure. ROI weights calculator 46 of FIG. 4 may form part of ROI quality metric calculator 61. Accordingly, one product of ROI quality metric calculator 46 may be an set of weights $w_i$, which may be based on user preference factor $\alpha$, as well video fidelity, spatial quality, and/or temporal quality values. As shown in FIG. 5, ROI quality metric calculator 61 receives user preference value $\alpha$ and one or more video distortion values. The video distortion values may be divided into ROI values and non-ROI values, and may include video fidelity values $D_{RF}$, $D_{NF}$, spatial quality values $D_{RS}$, $D_{NS}$, and temporal quality values $D_{RT}$, $D_{NT}$, $D_{RF}$ represents the video fidelity within the ROI, while $D_{NF}$ represents the video fidelity within the non-ROI region. $D_{RS}$ represents the spatial quality within the ROI area, while $D_{NS}$ represents the spatial quality within the non-ROI area. $D_{RT}$ represents temporal quality within the ROI area, while $D_{NT}$ represents temporal quality within the non-ROI area. The ROI quality metric jointly considers the users' interest, video fidelity and perceptual quality (spatial, temporal or both) in evaluating the quality of an encoded video sequence. In some embodiments, the metric may be used to bias the bit allocation algorithm applied by $\rho$ domain bit allocation module 48 to achieve better subjective visual quality.

Although ROI video coding has been widely studied, the quality measurement for ROI video has not been addressed in sufficient detail. Most quality measurement techniques use peak signal to noise ratio (PSNR) as a distortion measurement to evaluate the quality of ROI and non-ROI portions of a video frame. An ROI video quality metric is useful not only for analysis purposes, but as an input to bias weighted bit allocation techniques (e.g., as applied by bit allocation module 48 of FIG. 4) toward a subjective visual favorable solution. In general, as discussed above, the evaluation of an ROI video quality considers at least three aspects: users' ROI visual quality interest or preference $\alpha$, video fidelity of the reconstructed video data, and perceptual quality (spatial, temporal or both) of the reconstructed video data.

The user's preference $\alpha$ directly determines the classification of a video frame into ROI and non-ROI parts and their associated perceptual importance factors. In video telephony applications, a speaker's face region is a typical ROI because the human being's facial expression is very complicated and small variation can convey a large quantity of information. For the video fidelity factor, PSNR is a good measurement, which indicates the total amount of distortion of the reconstructed video frame compared to the original frame. The reconstructed frame is produced by decoding the encoded video frame, whereas the original frame is the video frame prior to encoding.

In many cases, video fidelity will be the most important consideration for video coding, where any improvement might cause better subjective visual quality. However, this is not always the case, which is why perceptual quality factors should also be taken into account in some cases. The perceptual quality considers both spatial errors and temporal errors. Spatial errors may include the presence of blocking (i.e., blockiness), ringing artifacts, or both. Temporal errors may include the presence of temporal flicker, i.e., when the visual qualities of the video frame change non-uniformly along the temporal axis. Temporal errors can result in choppy motion in a video sequence, which is undesirable.

$D_R$ and $D_{NR}$ denote the normalized per pixel distortion of the ROI and non-ROI, and $\alpha$ the ROI perceptual importance factor. If it is assumed that the relationship among the aspects mentioned above can be simplified into a linear function in video quality evaluation, then the overall distortion of the video sequence can be represented as:

$$D_{sequence} = \alpha D_R + (1-\alpha)D_{NR} \quad (1)$$

$$= \frac{\alpha}{M}\left[\begin{array}{l} \beta\sum_{i=1}^{M}D_{RF}(f_i,\tilde{f}_i)+\gamma\sum_{i=1}^{M}D_{RS} \\ (\tilde{f}_i)+(1-\beta-\gamma)D_{RT}(\tilde{f}_1,\ldots,\tilde{f}_M) \end{array}\right] +$$

$$\frac{(1-\alpha)}{M}\left[\begin{array}{l} \beta\sum_{i=1}^{M}D_{NF}(f_i,\tilde{f}_i)+\gamma\sum_{i=1}^{M}D_{NS} \\ (\tilde{f}_i)+(1-\beta-\gamma)D_{NT}(\tilde{f}_1,\ldots,\tilde{f}_M) \end{array}\right],$$

where $f_i$ and $\tilde{f}_i$ are the ith original and reconstructed frames within the M frames in the video sequence, $\beta$ and $\gamma$ are weighting factors, $D_R$ and $D_{NR}$ are the total distortion for ROI and non-ROI, $D_{RF}$, $D_{RS}$ and $D_{RT}$ are the normalized errors of ROI in fidelity, spatial perceptual quality and temporal perceptual quality, and $D_{NF}$, $D_{NS}$ and D are their counterparts for the non-ROI area. The values $\alpha$, $\beta$ and $\gamma$ should be assigned real values between 0 and 1. The resulting quality metric can be used as a cost function to formulate an optimization problem for the rho parameter in weighted bit allocation, or used for other problems in ROI processing.

In low-bitrate video applications, such as wireless video telephony, blocking (i.e., blockiness) artifacts are a major concern of spatial perceptual quality. This kind of artifact is caused by quantization where most of the high-frequency coefficients are removed, i.e., set to zero. The resulting effect is that the smoothed image blocks make the block boundaries quite pronounced. At the extreme low bit-rate cases, only DC coefficients will be coded, which makes the decoded image piece-wise constant blocks. In this disclosure, the ROI spatial quality value $D_{RS}$ (similar for $D_{NS}$) is defined as the normalized blockiness distortion, which may be represented as:

$$D_{RS}(\tilde{f}) = \frac{\text{boundaries with discontinuities}}{\text{Number of boundaries}}, \quad (2)$$

where boundaries between blocks are checked to see if perceivable discontinuities exists. A suitable discontinuity detection approach, which checks the sum of the mean squared difference of intensity slope across the block boundaries, is described in S. Minami and A. Zakhor, "An optimization approach for removing blocking effects in transform coding", *IEEE Trans. Circuits Systems for Video Technology*, Vol. 5, No. 2, pp. 74-82, April 1995, the entire content of which is incorporated herein by reference. The assumption of this approach is that the slopes on both sides of a block boundary should be identical and an abrupt change in slope is probably due to quantization.

In equation (1), the $D_{RT}$ (or $D_{NT}$) value is defined as an assigned score in the range of [0, 1] based on the variance of $D_{RS}$ (or $D_{NS}$) for all the frames in the video sequence. In this manner, the terms on video fidelity, spatial perceptual quality, and temporal perceptual quality are normalized and can be bridged by weighting parameters $\alpha$, $\beta$ and $\gamma$ to form a controllable video quality measurement. The selection of these weighting parameters is up to users based on their requirements and expectations. Again, this measurement may be helpful as an input to bias the bit allocation process toward favoring subjective perception. Consequently, the user may achieve a more visually pleasing result in ROI coding.

Figure 6:
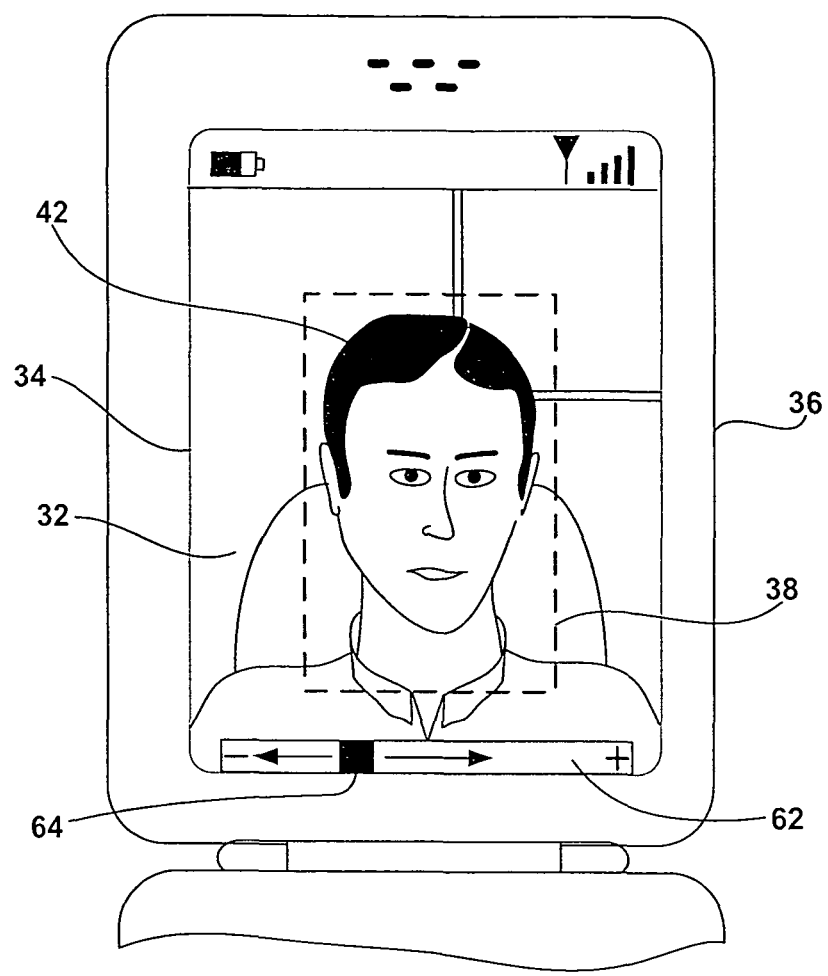
FIG. 6 is a diagram further illustrating a wireless communication device incorporating an ROI user preference input device for ROI quality metric calculation.

FIG. 6 is a diagram illustrating a wireless communication device 36 incorporating an ROI user preference input device 62 for ROI quality metric calculation. In FIG. 6, wireless communication device 36 generally conforms to FIG. 2, but further incorporates input device 62 to capture user preference α, which specifies the relative importance assigned to the ROI and non-ROI portions of video scene 32. In the example of FIG. 6, input device 62 is shown in the form of a slider bar with a slider 64 that can be moved along the length of the slider bar to indicate the degree of user preference α.

Using input device 62, the user can selectively adjust the user preference α to influence ROI bit allocation on a dynamic basis, e.g., by quality metric calculator 61. As the user preference α changes, the bit allocation between ROI and non-ROI portions of the video frame may change. Although a horizontal slider bar is depicted in FIG. 6, input device 62 may be realized by any of a variety of equivalent input media, such as a vertical slider bar, buttons, dials, drop-down percentage menus, and the like. Such input media may be manipulated via a touchscreen, or any of a variety of hard keys, soft keys, pointing devices, or the like.

Figure 7:
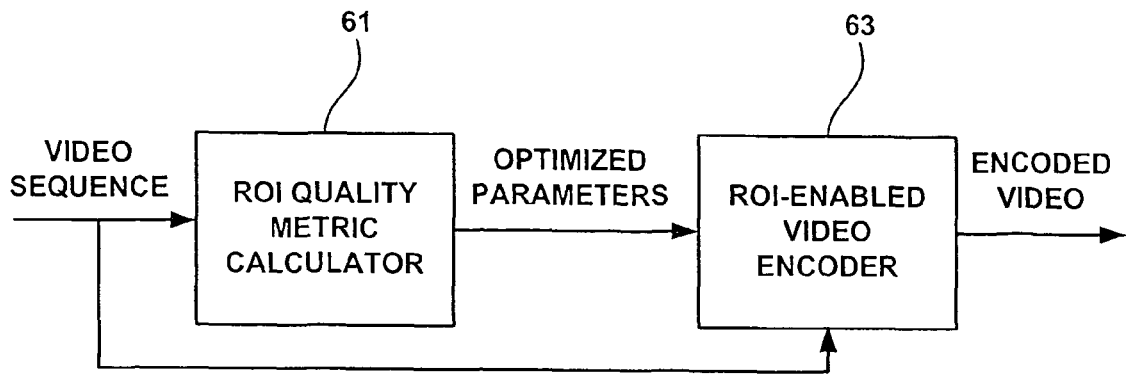
FIG. 7 is a block diagram illustrating use of an ROI quality metric calculator to analyze a video sequence for optimization of coding parameters applied by a video encoder.

FIG. 7 is a block diagram illustrating use of an ROI quality metric calculator 61 to analyze a video sequence for optimization of coding parameters applied by an ROI-enabled video encoder 63. As shown in FIG. 7, ROI quality metric calculator 61 is applied to analyze distortion values for an incoming video sequence before the video sequence is encoded by an ROI-enabled video encoder 63. Hence, ROI quality metric calculator analyzes distortion values, e.g., as described with reference to FIG. 5, for a video bitstream. Based on the distortion values and a user preference value α, ROI quality metric calculator generates a set of optimized parameters for use by video encoder 63 in encoding the incoming video sequence. The optimized parameters may include weights used by a bit allocation module to allocate encoding bits between ROI and non-ROI areas of a video frame, or values for other parameters used in bit allocation, such as weighting factors β and γ. In a sense, FIG. 7 represents an open-loop implementation in which ROI quality metric calculator 61 analyzes the incoming video stream prior to encoding, but does not analyze the encoded video. The quality metric results in generation of optimal coding parameters for use by the encoder 63.

Figure 8:
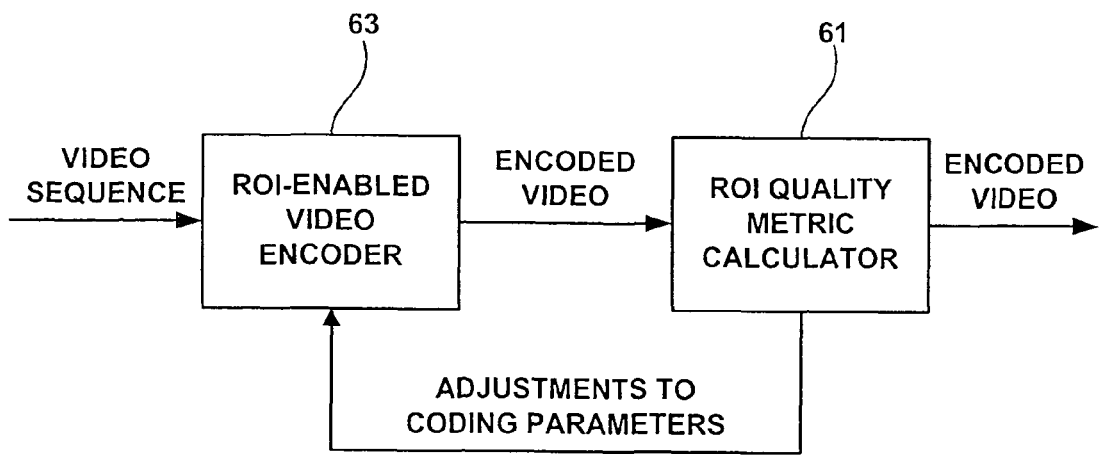
FIG. 8 is a block diagram illustrating use of an ROI quality metric calculator to analyze encoded video for adjustment of coding parameters applied by a video encoder.

FIG. 8 is a block diagram illustrating use of an ROI quality metric calculator 61 to analyze encoded video for adjustment of coding parameters applied by an ROI-enabled video encoder 63. In the example of FIG. 8, ROI quality metric calculator 61 analyzes distortion values associated with encoded video, as well as a user preference value α, to produce adjustments to coding parameters used by ROI-enabled video encoder 63. Hence, ROI quality metric calculator 61 analyzes the video after it has been encoded by ROI-enabled video encoder 63, and produces adjustments on a closed loop basis, e.g., to improve the performance of the video encoder and the quality of the encoded video. The adjustments to the coding parameters may include adjustments to weights used by a bit allocation module to allocate encoding bits between ROI and non-ROI areas of a video frame, or values for other parameters used in bit allocation, such as weighting factors β and γ. In the example of FIG. 8, the quality metric is used to iteratively encode and evaluate quality in loop until comparison of the quality metric to a threshold value is satisfied. In each iteration, the quality metric calculator 61 sends an improved set of coding parameters. Eventually, the iteration stops due to either satisfaction of a quality metric threshold or convergence of results.

Figure 9:
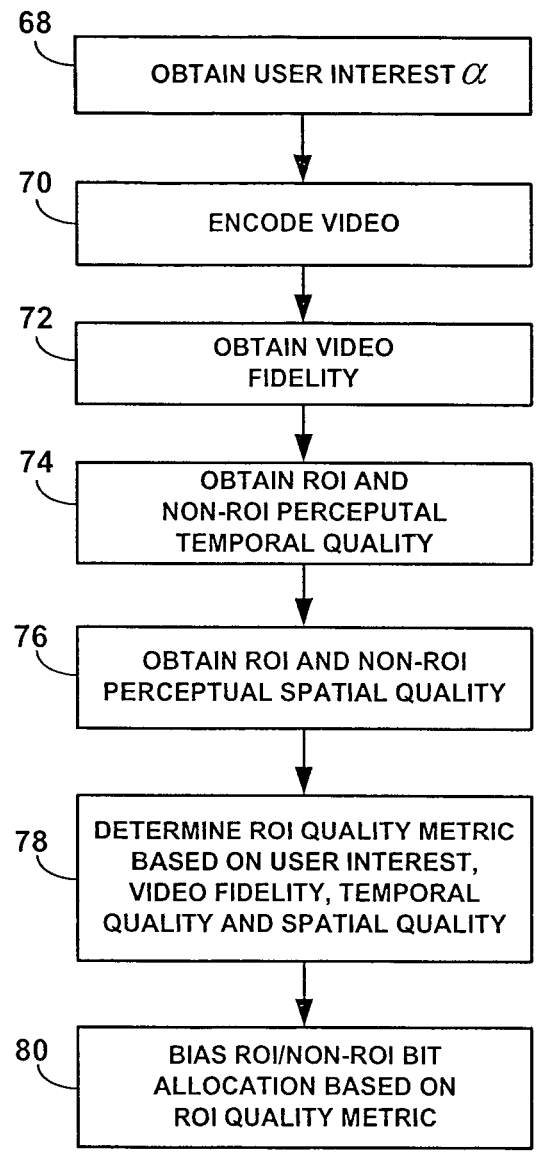
FIG. 9 is a flow diagram illustrating ROI quality metric calculation for encoded video.

FIG. 9 is a flow diagram illustrating ROI quality metric calculation. As shown in FIG. 9, given an applicable ROI MB map, ROI quality metric calculator 46 obtains the ROI user preference α (68) and encodes the ROI and non-ROI portions of the video frame (70). Upon reconstruction of the encoded video frame, distortion analyzer 60 analyzes the previously encoded video frame and original video frame to determine the video fidelity $D_{RF}$ and $D_{NF}$ of the ROI and non-ROI portions, respectively, of the preceding video frame. In addition, distortion analyzer 60 generates ROI and non-ROI perceptual temporal quality values $D_{RT}$, $D_{NT}$, respectively, as well as ROI and non-ROI perceptual spatial quality values $D_{RS}$, $D_{NS}$. ROI quality metric calculator 46 obtains the video fidelity (72), ROI and non-ROI temporal quality (74) and ROI and non-ROI spatial quality (76) values from distortion analyzer 60.

Based on the user preference α, video fidelity, spatial quality and temporal quality, ROI quality metric calculator 46 determines the ROI quality metric (78). Video fidelity measures the video errors in the reconstructed video frame relative to the original frame, e.g., in terms of color intensity values on a pixel-by-pixel basis. Spatial quality measures spatial errors, such as blocking and ringing artifacts in the reconstructed frame relative to the original frame. Temporal quality measures errors, such as temporal flicker where the frame visual qualities change non-uniformly along the temporal axis.

Notably, the user preference α is a current value applied by the user, whereas the video fidelity, spatial quality and temporal quality are derived from one or more frames that precede the current frame handled by bit allocation module 48. The user preference α may be fixed from frame-to-frame until such time that the user changes the value. A default value may be assigned to user preference factor α if the user has not specified a value. The ROI quality metric may be applied to bias bit allocation between the ROI and non-ROI of the current video frame (80), as described above with reference to FIG. 5. For example, the quality metric may be used to adjust weights for ROI bit allocation. In some embodiments, the functionality shown in FIG. 9 may represent operations performed by ROI quality metric calculator 61 in the "closed-loop" example of FIG. 8.

Figure 10:
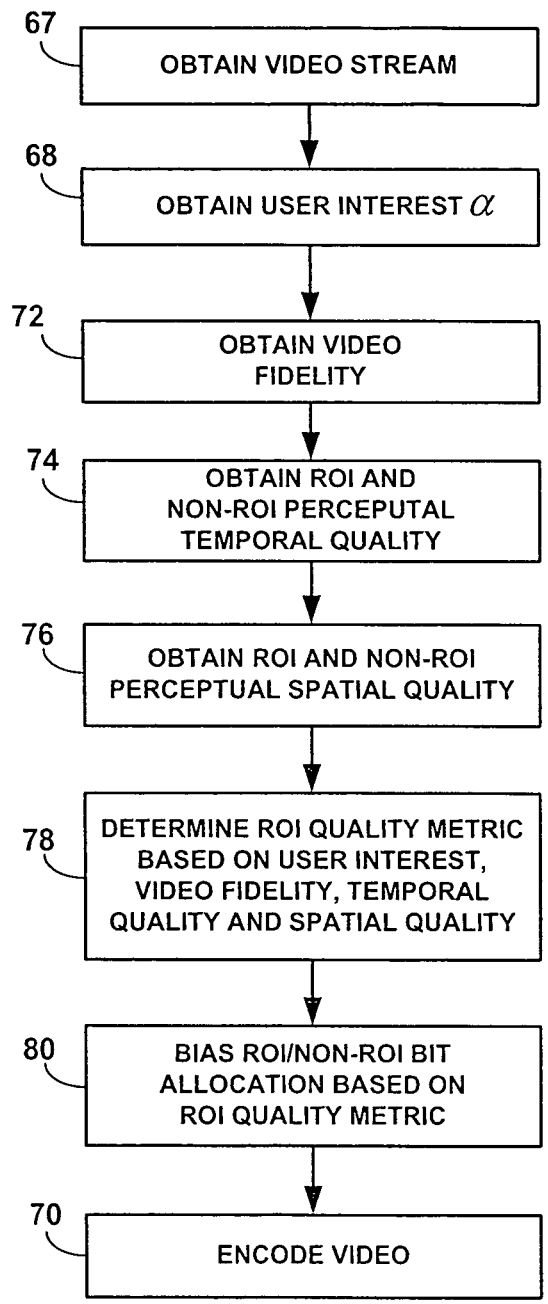
FIG. 10 is a flow diagram illustrating ROI quality metric calculation for a video sequence.

FIG. 10 is a flow diagram illustrating ROI quality metric calculation for a video sequence. FIG. 10 corresponds substantially to FIG. 9, but represents an embodiment in which the quality metric calculation is made relative to a video stream before the video stream is encoded. Accordingly, the process of FIG. 10 further includes obtaining the video stream (67). In addition, in contrast to FIG. 9, the video encoding (70) is performed after biasing the ROI/non-ROI bit allocation (80). In some embodiments, the functionality shown in FIG. 9 may represent operations performed by ROI quality metric calculator 61 in the "open-loop" example of FIG. 7.

Figure 11:
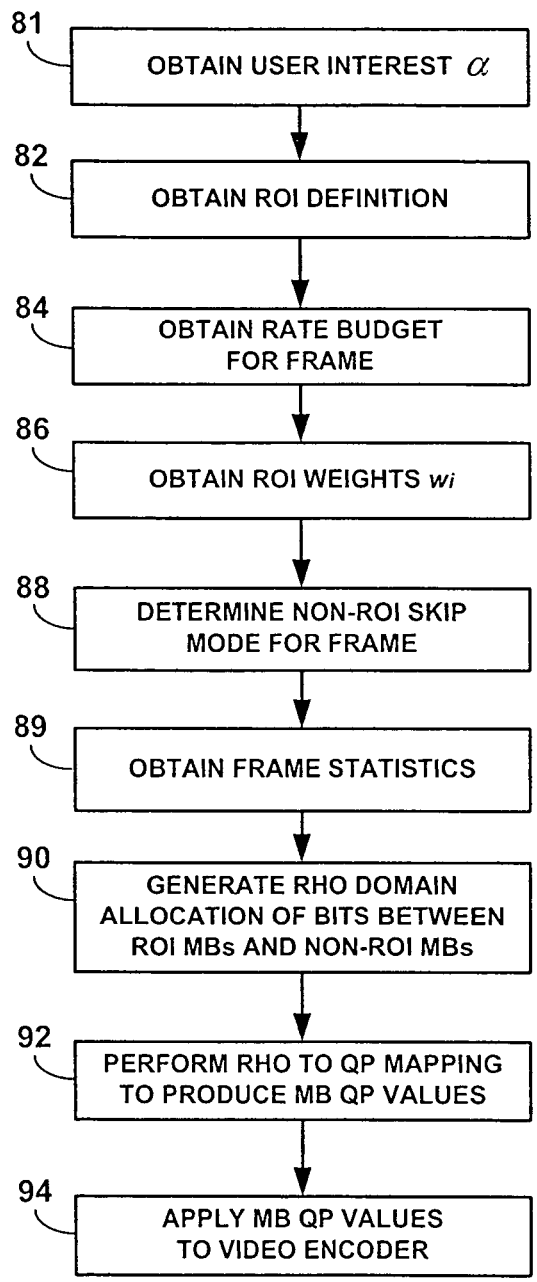
FIG. 11 is a flow diagram illustrating ROI ρ domain bit allocation.

FIG. 11 is a flow diagram illustrating ROI ρ domain bit allocation. As shown in FIG. 11, bit allocation module 48 obtains both an ROI definition (82) and rate budget for a frame (84). The ROI definition may take the form of an ROI MB map that identifies MBs or other video blocks that fall within the ROI. The rate budget provides the number of bits available for encoding the entire frame, including ROI and non-ROI areas. In addition, bit allocation module 48 obtains the ROI weights $w_i$ (86) from ROI weights calculator 46, which biases bit allocation between the ROI and non-ROI. Upon determining the non-ROI skip mode for the frame (88), i.e., whether skipping is ON or OFF for the frame, bit allocation module 48 obtains statistics for the current frame (89). The current frame statistics (89) can then be used to make the skipping mode decision for a subsequent frame or frames. The frame statistics may include, for example, a standard deviation of the residue of the frame following motion estimation. Alternatively, the frame statistics may be obtained for a previous frame or frames. With the skip mode indication (88), bit allocation module 48 is able to determine whether all available bits can be devoted to the ROI (non-ROI frame skipping ON) or whether the bits must be shared between ROI and non-ROI (non-ROI frame skipping OFF).

Using the ROI definition, frame rate budget, quality metric bias, and non-ROI skip mode, bit allocation module 48 generates a weighted ρ domain allocation of bits between the ROI MBs and non-ROI MBs (90). Upon determination of the ρ domain bit allocation, mapper 56 performs a ρ to QP mapping to provide MB QP values (92) for application to video encoder 58 (94). Mapper 56 may apply a ρ to QP mapping table, or an equation or function that generates a QP for a particular p. Video encoder 58 uses the QP values provided by the bit allocation module 48 and mapper 56 to encode individual ROI and non-ROI MBs within the applicable video frame. The resulting bit allocation may take into account not only the applicable frame budget, but also the availability of non-ROI skipping and the quality metric associated with a preceding frame or frames in the video sequence. The operation of bit allocation module 48 will be described in greater detail below.

The bit allocation technique described in this disclosure generally assumes the availability of sufficient ROI detection or definition, and the availability of acceptable frame-level rate control. On this basis, the bit allocation technique generally focuses on MB-level rate control between ROI and non-ROI MBs. Most conventional ROI bit allocation algorithms are based on a weighted version of the ITU H.263+ TMN8 model, where a cost function is created and the distortion components on various regions in the function are punished differently by using a set of preset weights. Like most of the other video standards, TMN8 uses a Q-domain rate control scheme, which models the rate and distortion with functions of QP. However, the bit allocation technique described in this disclosure makes use of a ρ domain rate control module, where ρ represents the number of non-zero quantized AC coefficients in an MB in video coding. The use of ρ domain bit allocation, as described herein, tends to be more accurate than QP domain rate control and may effectively reduce rate fluctuations.

In video coding applications, a typical problem is to minimize a distortion value $D_{sequence}$ with a given bit budget for the video sequence. The optimal solution for this complicated problem relies on an optimal frame-level rate control algorithm and an optimal macroblock-level bit allocation scheme. However, for real-time applications, such as video telephony, where very limited information about future frames is available when coding the current frame, it is not practical or feasible to pursue an optimal frame-level rate control. Typically, a popular algorithm ("greedy" algorithm) is applied. The greedy algorithm assumes that the complexity of the video content is uniformly distributed along the frames in the video sequence. On this basis, the greedy algorithm allocates a fraction of the available bits to each of the frames in the sequence. In real-time applications, the limited availability of future frame information also makes it difficult to consider temporal quality in rate control.

In this disclosure, to find a practical solution and simplify the bit allocation problem, it is generally assumed that a good frame-level rate control is available. This assumption reduces the bit allocation problem to macroblock-level bit allocation. At the same time, the bit allocation scheme may take advantage of a non-ROI skipping approach. The non-ROI skipping increases the chance to reduce the value of the temporal distortion term $D_{NT}(\tilde{f}_1, \ldots, \tilde{f}_M)$ because the skipped region will present the same perceptual quality as that of the previous frame. Thus, the skipping of the non-ROI area may reduce fluctuation of the perceptual quality between consecutive frames.

For purposes of illustration, the image quality of a video frame is evaluated according to equation (1). For simplicity, however, β and γ are set so that β+γ=1. Denoting $R_{budget}$ as the total bit budget for a given frame f and R the bit rate for coding the frame, the problem can be represented by the following function:

$$\text{Minimize } \alpha[\beta D_{RF}(f,\tilde{f})+(1-\beta)D_{RS}(\tilde{f})]+(1-\alpha)[\beta D_{NF}(f,\tilde{f})+(1-\beta)D_{NS}(\tilde{f})], \quad (3)$$

Such that $R \leq R_{budget}$.

The above optimization problem could be solved by Lagrangian relaxation and dynamic programming. However, the computational complexity of such an approach would be much higher than a real-time system could bear. Therefore, in accordance with this disclosure, a low-complexity near-optimal solution is preferred. In particular, in this disclosure, a two-stage bit allocation algorithm in the ρ domain is applied. The first stage involves the following optimization problem:

$$\text{Minimize } \alpha D_{RF}(f,\tilde{f})+(1-\alpha)D_{NF}(f,\tilde{f}), \text{ such that } R \leq R_{budget}. \quad (4)$$

After the optimal coding parameters for equation (4) are obtained, the second stage adjusts the coding parameters iteratively to reduce the term $\alpha D_{RS}(\tilde{f})+(1-\alpha)D_{NS}(\tilde{f})$ until a local minimum is reached. The result of this two-stage algorithm may be very close to the optimal solution when β is a relatively large number. When β=1, problems (3) and (4) are identical. In this disclosure, the focus is on the first stage and a solution to problem (4).

In ROI video coding, N is the number of MBs in the frame, $\{\rho_i\}$, $\{\sigma_i\}$, $\{R_i\}$ and $\{D_i\}$ are the set of ρ's, standard deviation, rates and distortion (sum of squared error), respectively, for the ith macroblocks. Thus, $$R = \sum_{i=1}^{N} R_i.$$

A set of weights $\{w_i\}$ is defined for all MBs in the frame as:

$$w_i = \begin{cases} \dfrac{\alpha}{K} & \text{if the } ith \text{ MB belongs to } ROI \\ \dfrac{1-\alpha}{(N-K)} & \text{if the } ith \text{ MB belongs to } Non\text{-}ROI \end{cases}, \quad (5)$$

where K is the number of MBs within the ROI. Equation (5) may be implemented, e.g., by ROI weights calculator 46. Therefore, the weighted distortion of the frame is:

$$D = \sum_{i=1}^{N} w_i D_i = [\alpha D_{RF}(f, \tilde{f}) + (1-\alpha)D_{NF}(f, \tilde{f})] * 255^2 * 384, \quad (6)$$

Hence the problem (4) can be rewritten as:

$$\text{Minimize } D, \text{ such that } R \leq R_{budget}. \quad (7)$$

Equation (7) is solved by using a modeling-based bit allocation approach. The distribution of the AC coefficients of a nature image can be best approximated by a Laplacian distribution $$p(x) = \frac{\eta}{2} e^{-\eta|x|}.$$

Therefore, the rate and distortion of the ith macroblock can be modeled in equations (8) and (9) below as functions of $\rho$.

For example, rate can be represented as:

$$R_i = A\rho_i + B, \qquad (8)$$

where A and B are constant modeling parameters, and A can be thought of as the average number of bits needed to encode non-zero coefficients and B can be thought of as the bits due to non-texture information.

In addition, distortion can be represented as:

$$D_i = 384\sigma_i^2 e^{-\theta\rho_i/384} \qquad (9)$$

where $\theta$ is an unknown constant and $\sigma$ is the standard deviation of the residual data. Here, the bit allocation technique optimizes $\rho_i$ instead of quantizers because it is assumed there is a sufficiently accurate $\rho$-QP table available to generate an acceptable quantizer from any selected $\rho_i$. In general, equation (7) can be solved by using Lagrangian relaxation in which the constrained problem is converted into an unconstrained problem as follows:

$$\underset{\rho_i}{\text{Minimize}}\ J_\lambda = \lambda R + D \qquad (10)$$

$$= \sum_{i=1}^{N}(\lambda R_i + w_i D_i)$$

$$= \sum_{i=1}^{N}[\lambda(A\rho_i + B) + 384 w_i \sigma_i^2 e^{-\theta\rho_i/384}],$$

where $\lambda^*$ is the solution that enables $$\sum_{i=1}^{N} R_i = R_{budget}.$$

By setting partial derivatives to zero in equation (10), the following expression for the optimized $\rho_i$ is obtained:

$$\text{let}\ \frac{\partial J_\lambda}{\partial \rho_i} = \frac{\partial \sum_{i=1}^{N} [\lambda(A\rho_i + B) + 384 w_i \sigma_i^2 e^{-\theta\rho_i/384}]}{\partial \rho_i} = 0, \qquad (11)$$

which is $$\lambda A - \theta w_i \sigma_i^2 e^{-\theta\rho_i/384} = 0, \qquad (12)$$

so $$e^{-\theta\rho_i/384} = \frac{\lambda A}{\theta w_i \sigma_i^2}. \qquad (13)$$

and $$\rho_i = \frac{384}{\theta}[\ln(\theta w_i \sigma_i^2) - \ln(\lambda A)]. \qquad (14)$$

On the other hand, because:

$$R_{budget} = \sum_{i=1}^{N} R_i = \frac{384 A}{\theta} \sum_{i=1}^{N} [\ln(\theta w_i \sigma_i^2) - \ln(\lambda A)] + NB, \qquad (15)$$

the following relationship holds, $$\ln(\lambda A) = \frac{1}{N}\sum_{i=1}^{N}\ln(\theta w_i \sigma_i^2) - \frac{\theta}{384 NA}(R_{budget} - NB). \qquad (16)$$

From equations (14) and (16), bit allocation model I is obtained as follows:

$$\rho_i = \frac{384}{\theta}\left[\ln(\theta w_i \sigma_i^2) - \frac{1}{N}\sum_{i=1}^{N}\ln(\theta w_i \sigma_i^2) + \frac{\theta}{384 NA}(R_{budget} - NB)\right] = \qquad (17)$$

$$\frac{R_{budget} - NB}{NA} + \frac{384}{\theta}\left[\ln(\theta w_i \sigma_i^2) - \frac{\sum_{i=1}^{N}\ln(\theta w_i \sigma_i^2)}{N}\right].$$

The resulting $\rho$ is then mapped to a corresponding QP, and used to allocate an appropriate number of coding bits to the respective ROI or non-ROI MB.

Another bit allocation model (bit allocation model II) may be obtained using an alternative distortion model. According to the alternative distortion model, assuming the availability of a uniform quantizer with step size q, the distortion caused by quantization is given by:

$$D(q) = 2\int_0^{0.5q} p(x)x\,dx + 2\sum_{i=1}^{\infty}\int_{(i-0.5)q}^{(i+0.5)q} p(x)|x - iq|\,dx = \qquad (18)$$

$$\frac{1}{\eta}\left[1 + \frac{e^{-\eta q}}{1 - e^{-\eta q}}(2 - e^{-0.5\eta q} - e^{0.5\eta q}) - e^{-0.5\eta q}\right]$$

and the percentage of zeros is given by $$\psi = \int_{-0.5q}^{0.5q} \frac{\eta}{2} e^{-\eta|x|}\,dx = 1 - e^{-0.5\eta q}. \qquad (19)$$

Thus, $$D(q) = \frac{\psi}{\eta(2-\psi)}. \qquad (20)$$

According to Shannon's source coding theorem, as described in T. M. Cover and J. A. Thomas, "*Elements of information theory*", Wiley, New York, N.Y., 1991, for a Laplacian source, the minimum number of bits needed to represent a symbol is given by:

$$R(q) = \log_2\left(\frac{1}{\eta D(q)}\right),\ \text{such that} \qquad (21)$$

$$R_i = \sum_{i=1}^{384} R(q) = 384\log_2\left(\frac{1}{\eta D(q)}\right) = 384\log_2\frac{2-\psi_i}{\psi_i}.$$

Since $$\psi_i = 1 - \frac{\rho_i}{384},$$

where 384 is the total number of coefficients in the ith macroblock for 4:2:0 video, equation (21) can be expanded by using Taylor expansion and the relationship between bit rate and ρ can be approximated by:

$$R_i = A\rho_i + B, \tag{22}$$

where A and B are constant modeling parameters, and A can be thought of as the average number of bits needed to encode a non-zero coefficients and B can be thought of as the bits due to non-texture information.

In addition, the variance of the coefficients is represented by:

$$\sigma^2 = \int_{-\infty}^{+\infty} p(x)x^2 dx = \int_{-\infty}^{+\infty} \frac{\eta}{2} x^2 e^{-\eta|x|} dx = \frac{2}{\eta^2}, \tag{23}$$

As a result, the distortion of the ith macroblock can be represented by:

$$D_i = \sum_{i=1}^{384} D(q) = \frac{384\psi_i}{\eta(2-\psi_i)} = \frac{384 - \rho_i}{\sqrt{2}(384+\rho_i)} \sigma_i. \tag{24}$$

As in the derivation of bit allocation model I, the optimal bit allocation scheme can be achieved by solving the optimization problem (7), i.e., the following problem:

$$\underset{\rho_i}{\text{Minimize}} \; D, \text{ such that } R \le R_{budget}. \tag{25}$$

In general, equation (25) can be solved by using Lagrangian relaxation in which the constrained problem is converted into an unconstrained problem as follows:

$$\underset{\rho_i}{\text{Minimize}} \; J_\lambda = \lambda R + D \tag{26}$$

$$= \sum_{i=1}^{N}(\lambda R_i + D_i)$$

$$= \sum_{i=1}^{N}\left[\lambda(A\rho_i + B) + \frac{(384-\rho_i)}{\sqrt{2}(384+\rho_i)}\sigma_i\right],$$

where λ* is the solution that enables $$\sum_{i=1}^{N} R_i = R_{budget}.$$

By setting partial derivatives to zero in (26), the following expression for the optimized $\rho_i$, is obtained:

$$\text{let } \frac{\partial J_\lambda}{\partial \rho_i} = \frac{\partial \sum_{i=1}^{N}\left[\lambda(A\rho_i + B) + \frac{(384-\rho_i)}{\sqrt{2}(384-\rho_i)}\sigma_i\right]}{\partial \rho_i} = 0, \tag{27}$$

which is:

$$\lambda A - \frac{384\sqrt{2}}{(384+\rho_i)^2}\sigma_i = 0, \tag{28}$$

so $$\rho_i = \sqrt{\frac{384\sqrt{2}}{A\lambda}\sigma_i} - 384. \tag{29}$$

On the other hand, because:

$$R_{budget} = \sum_{i=1}^{N} R_i = A \sum_{i=1}^{N} \sqrt{\frac{384\sqrt{2}}{A\lambda}\sigma_i} - 384NA + NB, \tag{30}$$

then $$\sqrt{\frac{384\sqrt{2}}{A\lambda}} = \frac{R_{budget} + 384NA + NB}{A\sum_{i=1}^{N}\sqrt{\sigma_i}}. \tag{31}$$

From equations (28) and (30), the following expression is obtained:

$$\rho_i = \frac{\sqrt{\sigma_i}}{\sum_{j=1}^{N}\sqrt{\sigma_j}}\left(\frac{R_{budget}}{A} - N\frac{B}{A}\right) + 384\frac{\sqrt{\sigma_i} - \frac{1}{N}\sum_{j=1}^{N}\sqrt{\sigma_j}}{\frac{1}{N}\sum_{j=1}^{N}\sqrt{\sigma_j}}, \tag{32}$$

$$= \frac{\sqrt{\sigma_i}}{\sum_{j=1}^{N}\sqrt{\sigma_j}}\rho_{budget} + 384\frac{\sqrt{\sigma_i} - \frac{1}{N}\sum_{j=1}^{N}\sqrt{\sigma_j}}{\frac{1}{N}\sum_{j=1}^{N}\sqrt{\sigma_j}},$$

where $\rho_{budget}$ is the total ρ budget for the frame.

Although the distortion is modeled differently in equation (32), based on that model, the following bit allocation model II is obtained:

$$\rho_i = \frac{\sqrt{w_i \sigma_i}}{\sum_{j=1}^{N}\sqrt{w_i \sigma_j}}\rho_{budget}. \tag{33}$$

Equation (33) may be implemented, e.g., by bit allocation module 48.

Figure 12:
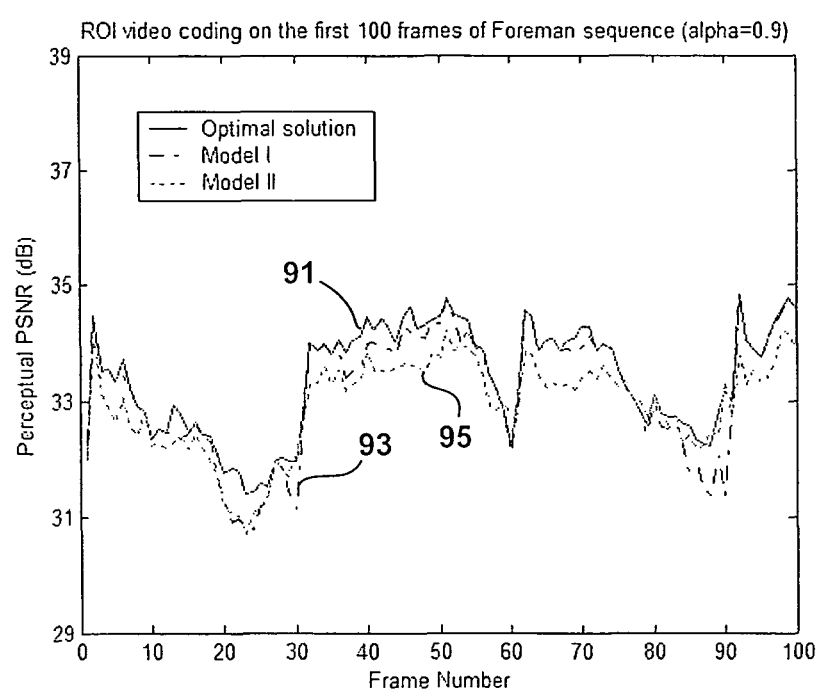
FIG. 12 is a graph comparing overall perceptual quality of encoding techniques using weighted bit allocation models and an optimal solution.

FIG. 12 is a graph comparing overall perceptual quality of encoding techniques using weighted bit allocation models I and II and an optimal solution. The optimal solution is achieved by Lagrangian relaxation, whereas bit allocation models I and II are implemented as described above. FIG. 12 shows PSNR in decibels versus frame number during ROI coding of the first 100 frames of the standard Foreman video test sequence. In FIG. 12, the optimal solution, bit allocation model I, and bit allocation model II are identified by reference numerals 91, 93 and 95, respectively. For bit allocation models I and II, the value of α is 0.9 for purposes of bit allocation weighting equation (5). As shown in FIG. 12, both bit allocation models I and II perform very well in comparison to the optimal solution.

Figure 13:
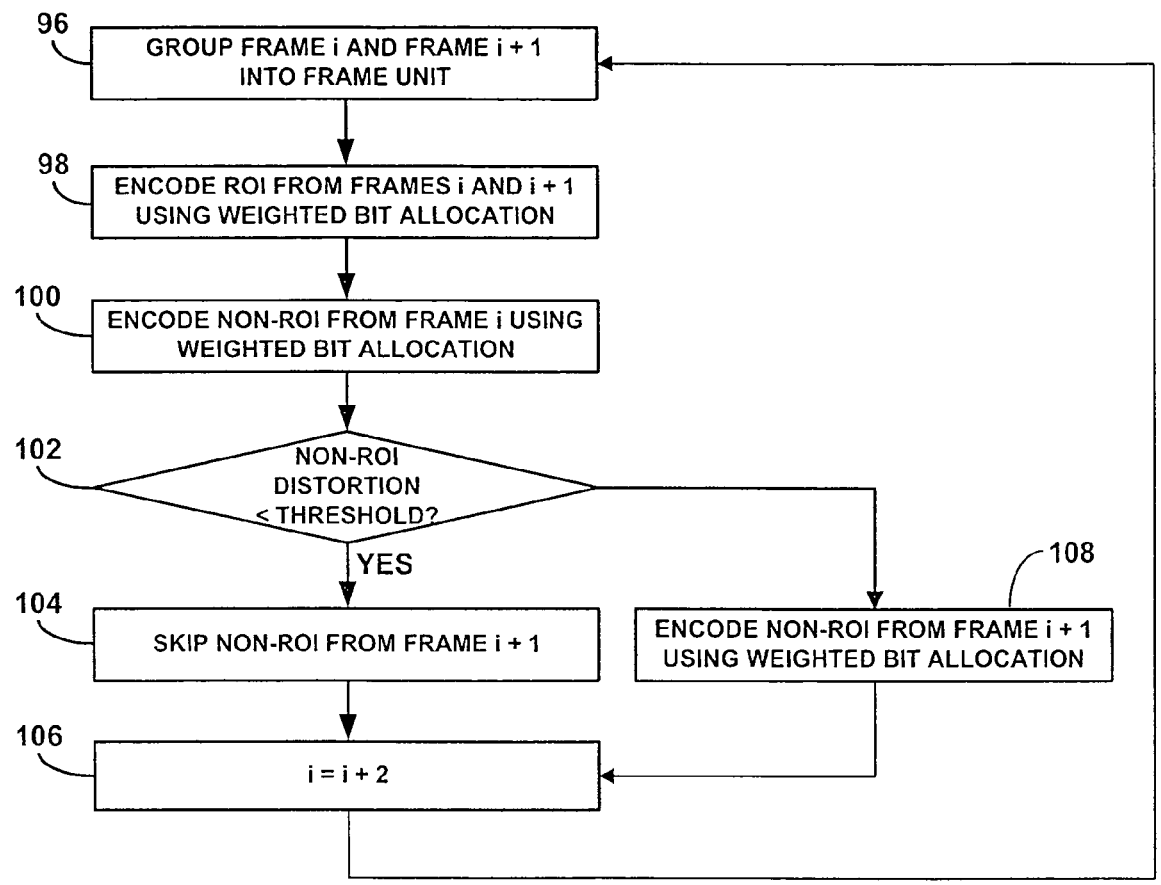
FIG. 13 is a flow diagram illustrating a technique for non-ROI skipping.

FIG. 13 is a flow diagram illustrating a technique for non-ROI ("background") skipping. The ability to skip encoding of non-ROI areas of a video frame can result in significant savings in bit allocation. If a non-ROI is not encoded, i.e., skipped, the bits otherwise allocated to the non-ROI can instead be re-allocated for encoding the ROI to improve visual quality of MBs in the ROI. If the non-ROI is skipped for a given frame, the non-ROI encoded for a preceding frame is repeated or substituted by an interpolated non-ROI area in the current frame. In addition to conserving bits for ROI encoding, the skipping of the non-ROI area may improve the temporal quality of the current frame. In particular, presenting the same non-ROI area in two or more consecutive frames will tend to reduce temporal flicker in the non-ROI areas.

At very low bitrate, e.g., at 32 kbps, the non-ROI regions are normally coarsely coded even if the bits are uniformly distributed among MBs, where temporal visual quality issues such as flickering become prominent. On the other hand, in most cases of video telephony applications where background are non-ROI, there are very limited movements in the background. Therefore, background skipping is a solution for reallocating bits to improve the quality of ROI and coded non-ROI regions as long as the skipping does not severely degrade the video fidelity.

Frame skipping is a popular approach used in very low-bitrate applications to conserve coding bits. The difference between non-ROI skipping and frame skipping is that the ROI for each frame is coded in the non-ROI skipping approach to ensure good visual quality of the ROI. Frame skipping is very helpful in many applications. In ROI video coding, however, frame skipping would risk the loss of important information such as facial expressions, especially when α is set at a large value in equation (1), as any distortion of ROI would be heavily punished and could degrade the overall performance. Therefore, non-ROI skipping is a better choice and can generally save a significant number of bits to improve ROI quality because the number of background MBs is dominant in normal video frames.

As shown in FIG. 13, the non-ROI skipping technique involves a grouping of successive frames into a unit that includes the ROI areas for the frames and a common non-ROI area shared among the frames. In the example of FIG. 13, two consecutive frames are grouped. The non-ROI background skipping module 50 groups frames i and i+1 into a frame unit (96), and notifies video encoder 58 of the frame in which the non-ROI area will be skipped. In response, video encoder 58 encodes the respective ROI areas of frames i and i+1 using the weighted bit allocation provided by bit allocation module 48 (98). In addition, video encoder 58 encodes the non-ROI area of frame i using the weighted bit allocation (100). However, video encoder 58 does not encode the non-ROI area of frame i+1. Instead, the non-ROI area of frame i+1 is skipped, and the non-ROI area of the preceding frame i is provided in its place.

The non-ROI skipping may be provided on a full-time basis. For example, every two frames may be grouped into a unit for purposes of continuous, full-time skipping of the non-ROI on an alternating frame basis. In other words, the non-ROI in every second frame may be skipped on a full-time basis. As an alternative, skipping may be activated and deactivated on an adaptive basis. Skipping may be deactivated when non-ROI distortion produced by a recent, previous frame exceeds a distortion threshold. As shown in FIG. 13, for example, if distortion in the non-ROI area of a previous frame is less than the threshold (102), the non-ROI for frame i+1 is skipped (104), and the process continues to the next group of two successive frames, as represented by the frame increment i=i+2 (106). In this case, the level of non-ROI distortion is acceptable, and skipping is activated. If non-ROI distortion is greater than the distortion threshold (102), however, the non-ROI area of frame i+1 is encoded using weighted bit allocation (108). In this case, skipping is deactivated due to excessive non-ROI distortion, i.e., excessive distortion within the non-ROI area of the pertinent video scene.

Figure 14:
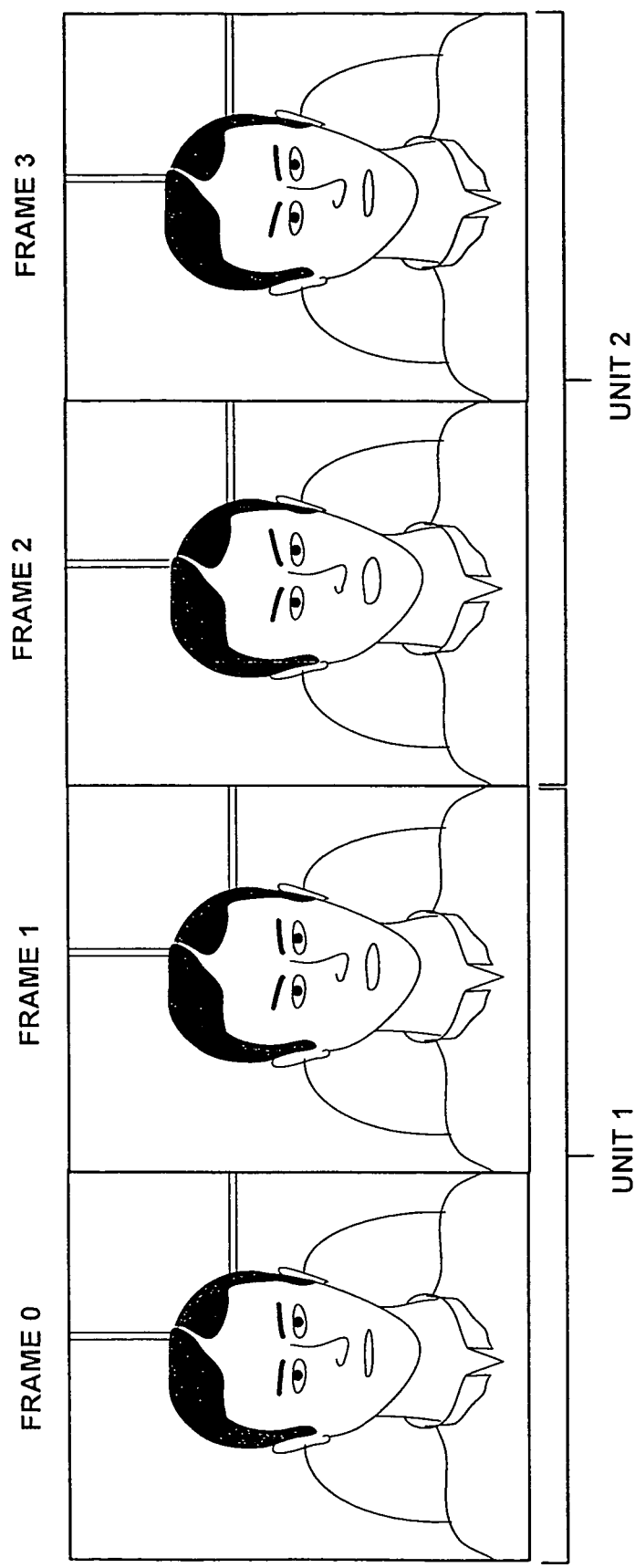
FIG. 14 is a diagram illustrating grouping of successive frames into frame units to support non-ROI skipping.

FIG. 14 is a diagram illustrating grouping of successive frames in a unit to support non-ROI skipping. As shown in FIG. 14, frames 0, 1, 2 and 3 represents successive frames within a video sequence. In this example, frame 0 and frame 1 are grouped into unit 1, and frame 2 and frame 3 are grouped into unit 2. Each unit shares a common non-ROI area. In particular, in the case of either full-time skipping or adaptive skipping with acceptable distortion, the non-ROI area of frame 0 is repeated for frame 1. Because the non-ROI area of frame 0 is repeated for frame 1, it is not necessary to encode the non-ROI area of frame 1. The grouping of frames into units may be applied throughout a video sequence. In the example of FIG. 14, two frames are grouped into a unit. In some applications, however, two or more frames may be grouped into a unit, with the non-ROI being skipped in all but one of the frames in the unit.

Figure 15:
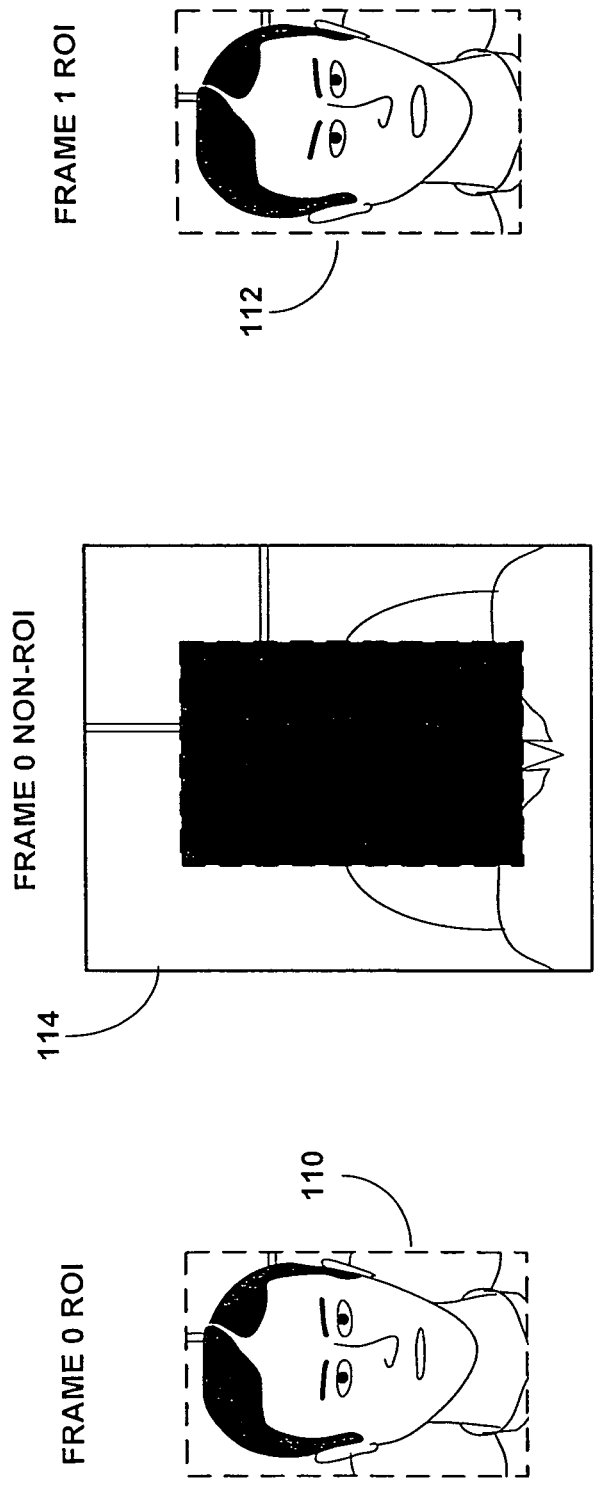
FIG. 15 is a diagram illustrating encoding of successive ROI areas with a common non-ROI area to support non-ROI skipping.

FIG. 15 is a diagram illustrating encoding of successive ROI areas with a common non-ROI area. In particular, upon grouping successive frames 0 and 1 into a unit, the ROI areas 110, 112 in frames 0 and 1, respectively, are encoded. However, the frame 0 non-ROI area 114 is repeated for both frame 0 and frame 1, such that the non-ROI area (not shown) for frame 1 is skipped. In this manner, the bit consumption otherwise required for encoding the frame 1 non-ROI can be avoided. In the example of FIG. 15, it should be noted that the non-ROI area 114, although referred to as "background," may include foreground features such as a person's shoulders. Accordingly, background is generally used in this disclosure to refer to any area outside the ROI, and should not be considered as strictly limited to background imagery within a video scene. The non-ROI skipping is described in further detail below.

An exemplary prototype system for implementation of non-ROI skipping module 50 of FIG. 4 will now be described. In the prototype system, every two frames are grouped into a unit as described above with reference to FIGS. 13-15. In each unit, the first non-ROI area is coded while the second non-ROI area is skipped, e.g., using predicted MBs with zero motion vectors. The bit allocation for each unit may be based on the same logic as the "greedy" frame-level bit allocation, with the assumption that the content complexity of the video frames in a sequence is uniformly distributed across the frames. With this assumption, the bits should be allocated uniformly among two-frame units as:

$$\rho_{unit\,i} = \frac{\rho_{Sequence} - \rho_{used}}{\frac{M}{2} - i}, \tag{34}$$

where $\rho_{sequence}$ is the total ρ-budget for a group of M consecutive frames in the video sequence, $\rho_{unit\,i}$ is the ρ allocation for the ith unit, and $\rho_{used}$ is the ρ consumption of the first (i−1)/2 units. Within a unit, either bit allocation model (I or II) may be used to allocate bits to MBs within the ROI and non-ROI areas.

To evaluate the results of non-ROI skipping, as described herein, several tests have been performed. In the tests, the following bit allocation techniques were compared: (a) a weighted bit allocation algorithm, based on model II, with full-time non-ROI skipping; (b) a weighted bit allocation algorithm, based on model II, without non-ROI skipping; and (c) a "greedy" algorithm, in which ROI and non-ROI MBs are equally treated in the bit allocation. The tests were conducted on the first 150 frames of the standard "Carphone" QCIF video sequences at a rate of 15 frames per second (fps). The results of the comparison are shown in FIGS. 16-23.

Figure 16:
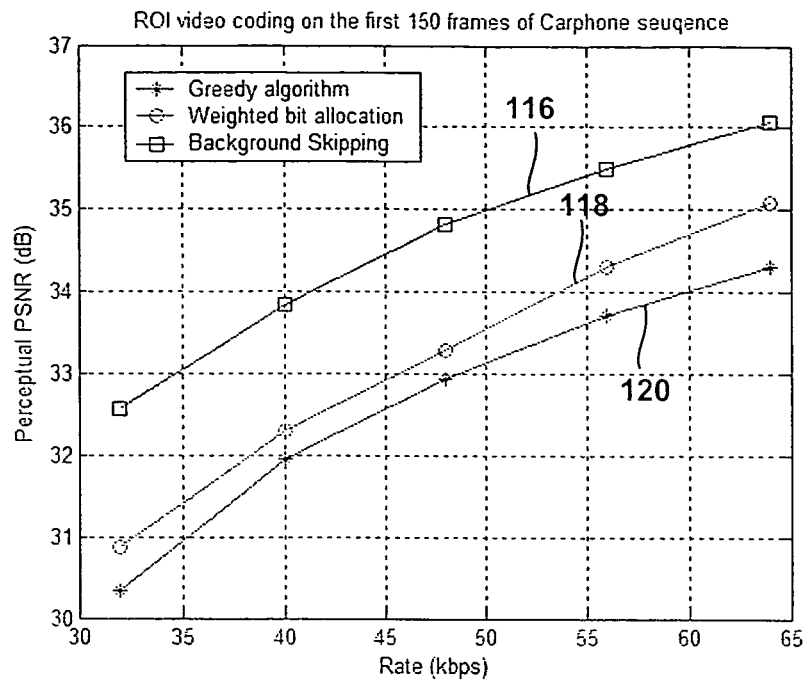
FIG. 16 is a graph comparing overall perceptual quality of ROI encoding techniques using standard bit allocation, weighted bit allocation, and background skipping with a user preference factor α=0.9.
Figure 17:
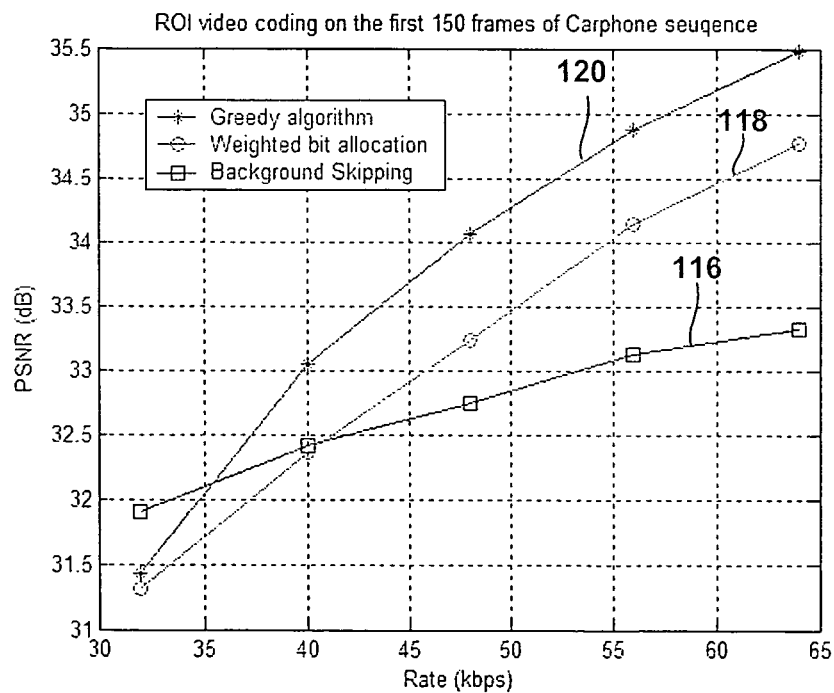
FIG. 17 is a graph comparing overall video fidelity of ROI encoding techniques using standard bit allocation, weighted bit allocation, and background skipping with a user preference factor α=0.9.

FIG. 16 is a graph comparing overall perceptual quality of the above encoding techniques (a), (b) and (c). In particular, FIG. 16 plots perceptual PSNR in decibels (db) over a range of encoding rates in kilobits per second (kbps). FIG. 17 is a graph comparing overall video fidelity of the above encoding techniques (a), (b) and (c). The term "overall" video fidelity refers to the combination of both ROI and non-ROI areas, i.e., video fidelity of the entire frame, and may alternatively be referred to as "frame" video fidelity. FIG. 17 plots "frame" PSNR in decibels (db) over a range of encoding rates in kilobits per second (kbps).

Figure 18:
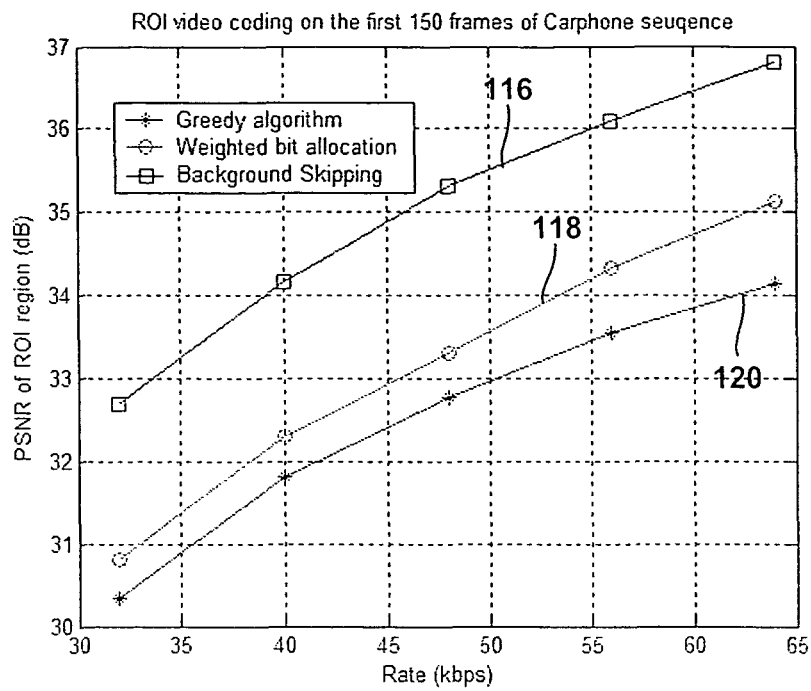
FIG. 18 is a graph comparing ROI video fidelity of ROI encoding techniques using standard bit allocation, weighted bit allocation, and background skipping with a user preference factor α=0.9.
Figure 19:
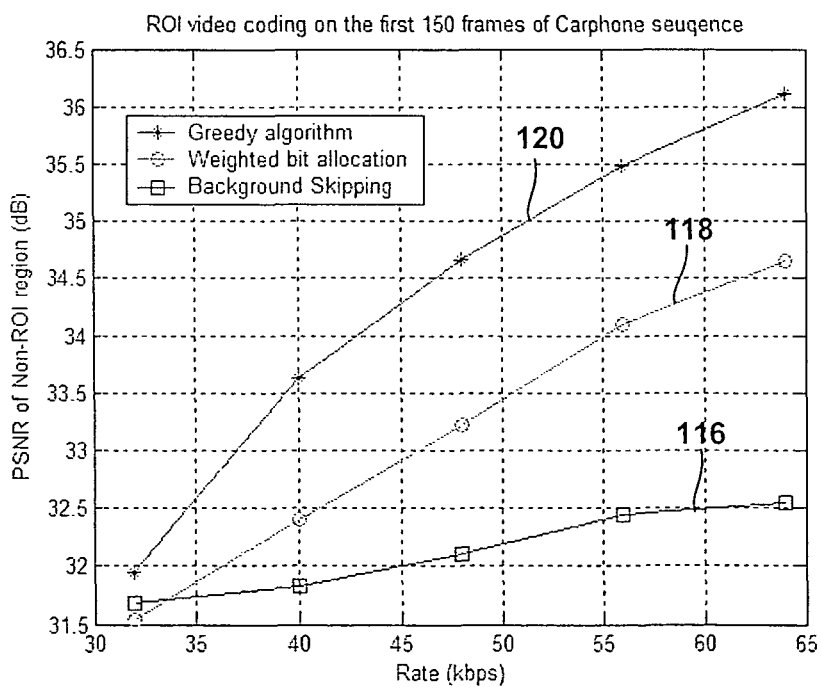
FIG. 19 is a graph comparing non-ROI video fidelity of ROI encoding techniques using standard bit allocation, weighted bit allocation, and background skipping with a user preference factor α=0.9.

FIGS. 18 and 19 are graphs comparing ROI video fidelity and non-ROI video fidelity, respectively, of the above encoding techniques (a), (b) and (c). In particular, FIGS. 18 and 19 plot PSNR in decibels (dbs) over a range of encoding rates in kilobits per second (kbps). ROI video fidelity, per FIG. 18, refers to video fidelity within the ROI area of the video frame. The non-ROI video, per FIG. 19, refers to video fidelity within the non-ROI area of the video frame. FIGS. 16-19 represent application of a user preference factor α=0.9 in the weighted bit allocation algorithms. In each of FIGS. 16-19, the curves for (a) weighted bit allocation with full-time non-ROI skipping, (b) weighted bit allocation with no skipping, and (c) the greedy algorithm are identified by reference numerals 116, 118, 120, respectively.

Figure 20:
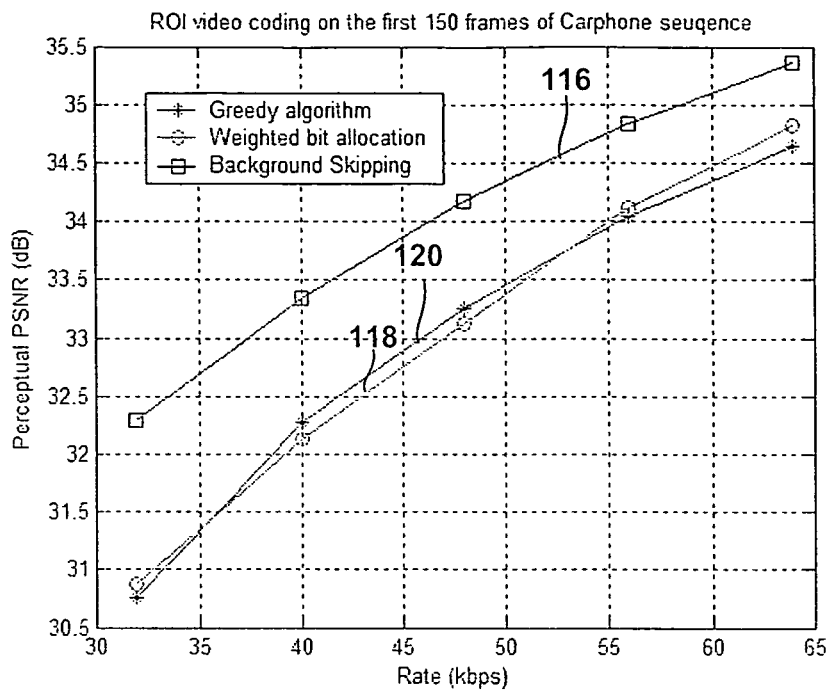
FIG. 20 is a graph comparing overall perceptual quality of ROI encoding techniques using standard bit allocation, weighted bit allocation, and background skipping with a user preference factor α=0.7.
Figure 21:
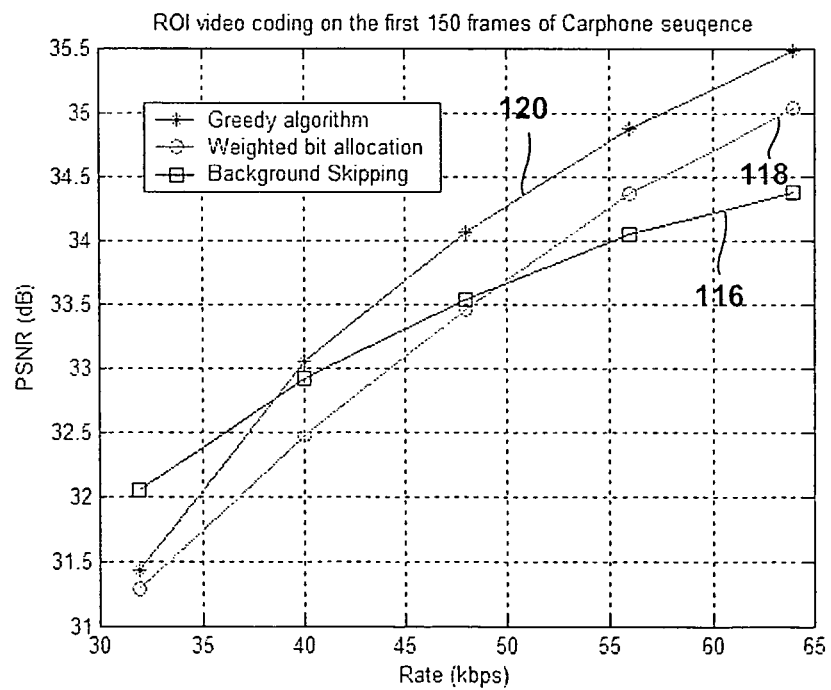
FIG. 21 is a graph comparing overall video fidelity of ROI encoding techniques using standard bit allocation, weighted bit allocation, and background skipping with a user preference factor α=0.7.
Figure 22:
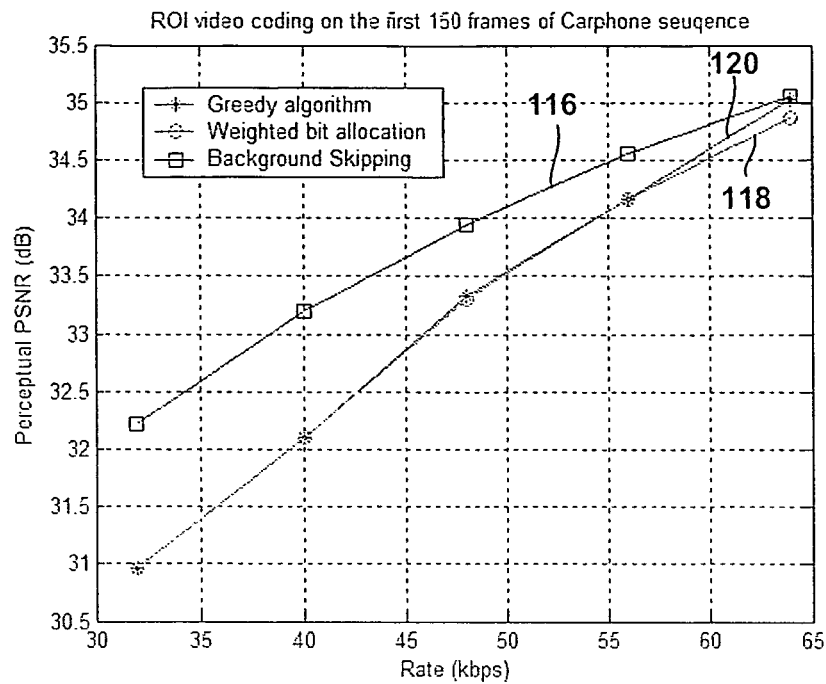
FIG. 22 is a graph comparing overall perceptual quality of ROI encoding techniques using standard bit allocation, weighted bit allocation, and background skipping with a user preference factor α=0.5.
Figure 23:
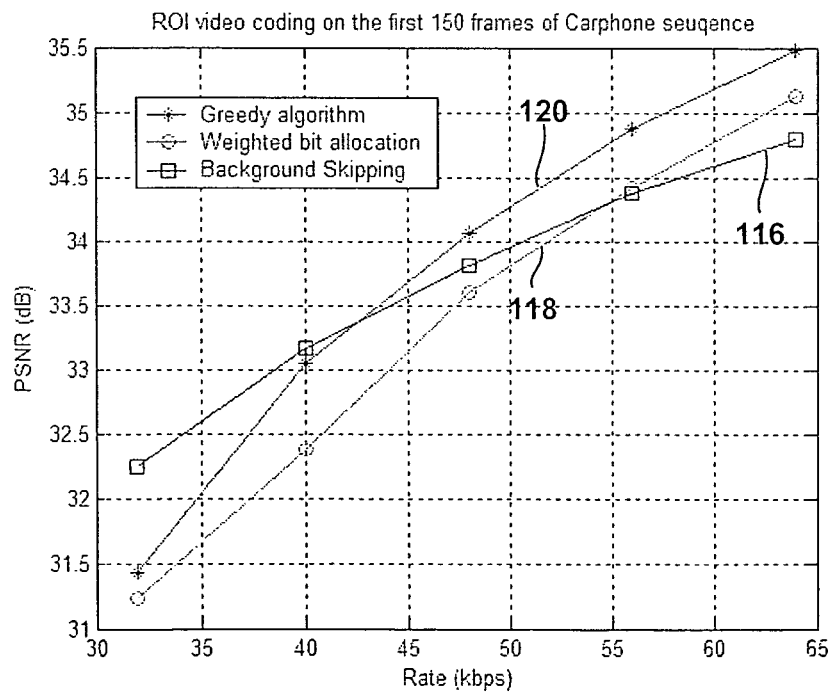
FIG. 23 is a graph comparing overall video fidelity of ROI encoding techniques using standard bit allocation, weighted bit allocation, and background skipping with a user preference factor α=0.5.

FIGS. 20 and 21 are graphs comparing overall perceptual quality and overall video fidelity, respectively, of the above encoding techniques (a), (b), (c). In particular, FIG. 20 plots perceptual PSNR in decibels (db) over a range of encoding rates in kilobits per second (kbps). FIG. 21 plots PSNR in decibels (db) over a range of encoding rates in kilobits per second (kbps). FIGS. 20 and 21 represent application of a user preference factor α=0.7 in the weighted bit allocation algorithms. FIGS. 22 and 23 are graphs comparing overall perceptual quality and overall video fidelity, respectively, of encoding techniques (a), (b) and (c). FIGS. 22 and 23 represent application of a user preference factor α=0.5 in the weighted bit allocation algorithms. In FIGS. 20-23, the curves for (a) weighted bit allocation with full-time non-ROI skipping, (b) weighted bit allocation with no skipping, and (c) the greedy algorithm are identified by reference numerals 116, 118, 120, respectively.

For the test results shown in FIGS. 16-23, the four sets of video quality measures, Perceptual PSNR, Frame PSNR, ROI PSNR, and non-ROI PSNR, have been defined as follows:

$$\text{Perceptual } PSNR = -10 \log_{10} D_{Frame}; \quad\quad 1$$

$$\text{Frame } PSNR = -10 \log_{10} D_F(f,\tilde{f}); \quad\quad 2$$

$$ROI\ PSNR = -10 \log_{10} D_{RF}(f,\tilde{f}); \text{ and} \quad\quad 3$$

$$\text{Non-}ROI\ PSNR = -10 \log_{10} D_{NF}(f,\tilde{f}). \quad\quad 4$$

In the above expressions, $D_{Frame}$ is the overall temporal and spatial distortion for a frame, $D_F$ is the video fidelity between an original frame and a reconstructed frame, $D_{RF}$ is the video fidelity between the ROI areas of an original frame and a reconstructed frame, and $D_{NF}$ is the video fidelity between the non-ROI areas of an original frame and a reconstructed frame. Perceptual PSNR is shown in FIGS. 16, 20, and 22. Frame PSNR is shown in FIGS. 17, 21, and 23. ROI PSNR is shown in FIG. 18, and non-ROI PSNR is shown in FIG. 19. The results shown in FIGS. 16-23 demonstrate that the proposed non-ROI skipping approach has gains of more than 1 dB in Perceptual PSNR (PPSNR) compared with the other approaches in all of the tests. The gains mainly come from the improvement of the ROI quality, as shown in FIGS. 18 and 19, by reallocating bits from non-ROI to ROI in coding the frames.

An interesting observation is that the non-ROI (background) skipping approaches also outperformed other approaches in terms of frame PSNR at low bit rate, as shown in FIGS. 17, 21 and 23. In addition, the graphs show that the gains in frame PSNR increase with the decreasing of user preference factor α. These observations indicate that the non-ROI skipping approach is very appealing for very low-bitrate applications like wireless VT, because it outperforms other approaches not only in terms of video fidelity but also visual quality. It is expected that the weighted bit allocation approach will outperform the greedy algorithm when α is assigned a larger value, e.g., α=0.9 in FIG. 16. However, the advantage decreases with the decreasing of a as shown in FIGS. 20 and 22.

Figure 24:
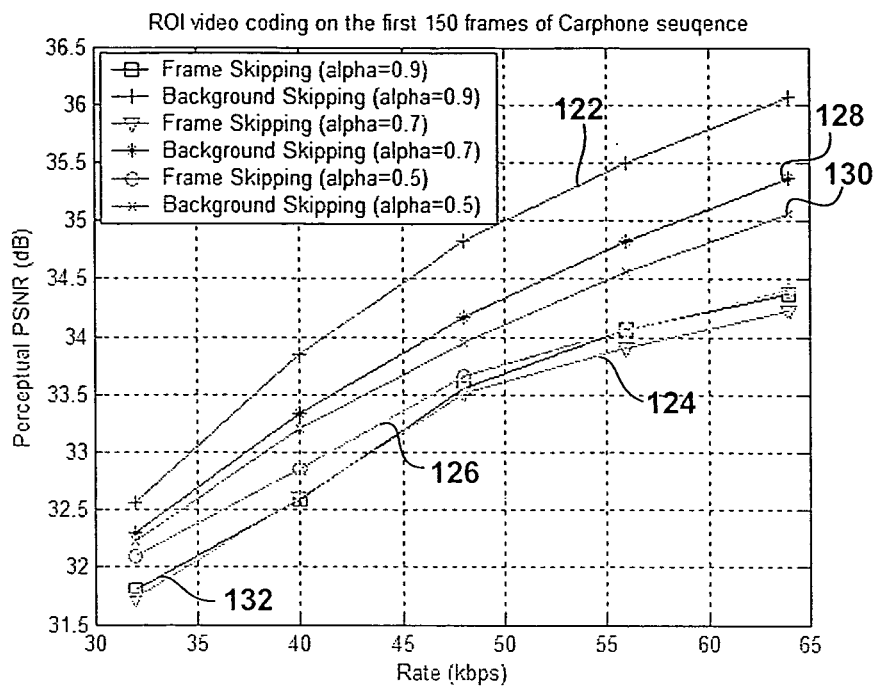
FIG. 24 is a graph comparing perceptual quality of ROI encoding techniques using standard frame skipping and non-ROI skipping at various user preference factor values.

Additional tests have been performed to evaluate the performance of bit allocation techniques incorporating non-ROI skipping versus weighted bit allocation techniques that rely on frame skipping, i.e., skipping of an entire frame instead of skipping only the non-ROI area. FIG. 24 is a graph comparing perceptual quality of ROI encoding techniques using standard frame skipping and background skipping. In each case, weighted bit allocation, as described herein, was applied. In one case, non-ROI (background) skipping was applied. In the other case, full-time frame skipping was applied such that every other frame was skipped on an alternating basis. FIG. 24 plots perceptual PSNR in decibels versus rate in kilobits per second (kbps). In FIG. 24, reference numerals 122, 124 and 126 identify curves for weighted bit allocation with frame skipping and a user preference factor α=0.9, 0.7, and 0.5, respectively. Reference numerals 128, 130, 132 identify curves for weighted bit allocation with non-ROI skipping and a user preference factor α=0.9, 0.7, and 0.5, respectively. As shown in FIG. 24, weighted bit allocation with non-ROI skipping outperformed weighted bit allocation with frame skipping in all settings of α. The performance gain provided by non-ROI skipping increases with increases in the value of α. This result is reasonable because with larger α, the punishment on ROI for frame skipping becomes heavier.

Figure 25:
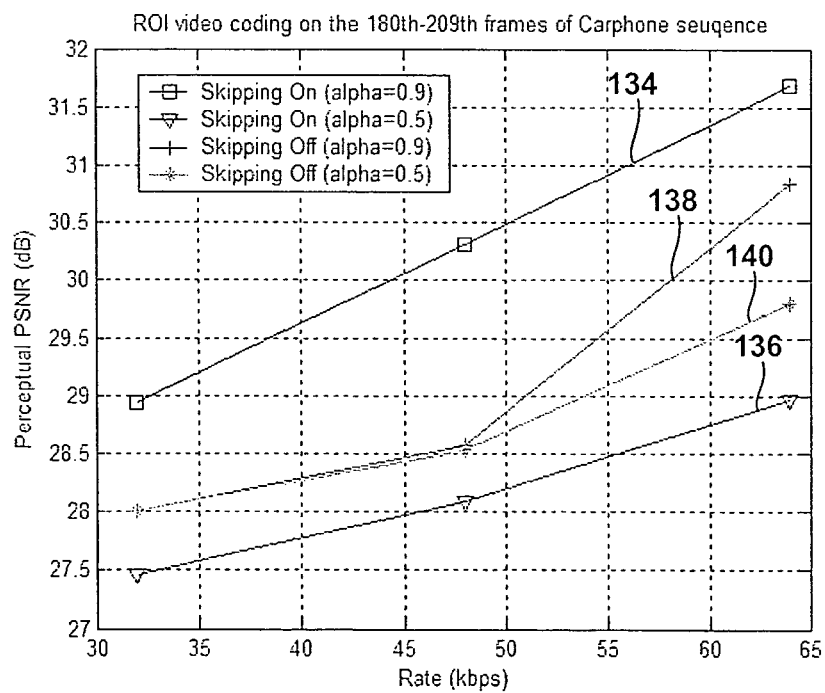
FIG. 25 is a graph comparing perceptual quality of ROI encoding techniques when non-ROI skipping is on and off.

As demonstrated by FIGS. 16-24, the non-ROI background skipping approach results in good performance, particularly when the non-ROI maintains relatively low movement. For video sequences having non-ROI areas that contain a large amount of motion, however, the performance gain may be diminished. At the same time, important background information may be skipped, resulting in degradation of system performance. Accordingly, it is desirable that background skipping be turned off when the skipping severely degrades video fidelity, e.g., when the background content contains important information. As an example, ROI coding by weighted bit allocation with non-ROI skipping turned on and off was applied to the $180^{th}$ to $209^{th}$ frames of the standard Carphone video test sequence, in which the background moves quickly. FIG. 25 shows the results of this analysis. More particularly, FIG. 25 is a graph comparing perceptual quality of ROI encoding techniques for weighted bit allocation, as described herein, when non-ROI skipping is turned on and off.

FIG. 25 graphs perceptual PSNR in decibels versus rate in kilobits per second. In FIG. 25, reference numerals 134 and 136 identify curves representing application of weighted bit allocation with non-ROI skipping turned on and user preference factor α=0.9 and 0.5, respectively. Reference numerals 138, 140 identify curves representing application of weighted bit allocation with non-ROI skipping turned off and user preference factor α=0.9 and 0.5, respectively. The results in FIG. 25 indicate that the advantage of non-ROI skipping compared decreases with the decreasing of α, e.g., from 0.9 to 0.5. This result also indicates the value of developing an adaptive non-ROI skipping approach that enables dynamic control of the non-ROI skipping based on the content of the video sequence and the user's interest level, as represented by user preference factor α.

The distortion produced by weighted bit allocation with and without non-ROI skipping can be explicitly compared, as indicated below:

$$D_{Skip\_on} = \alpha D_{RF}(\rho_1) + (1-\alpha)D_{NF}(\rho_2) + \alpha D_{RF}(\rho_{unit} - \rho_1 - \rho_2) + (1-\alpha)D_{NonROI\_skip}, \quad (35)$$

$$D_{Skip\_off} = \alpha D_{RF}(\rho_1') + (1-\alpha)D_{NF}(\rho_2') + \alpha D_{RF}(\rho_3') + (1-\alpha)D_{NF}(\rho_{unit} - \rho_1' - \rho_2' - \rho_3'), \quad (36)$$

where $D_{Skip\_on}$ is the unit total distortion when the non-ROI skipping mode is on, $D_{Skip\_off}$ is the unit total distortion when the background skipping mode is off, $D_{NonROI\_skip}$ is the distortion caused by skipping the non-ROI in the second frame of the unit, and where $\rho_1$ and $\rho_2$ in equation (35) and $\rho_1'$, $\rho_2'$ and $\rho_3'$ in equation (36) are the number of AC coefficients (ρ) allocated to the ROIs and non-ROI.

It can be observed from equations (35) and (36) that $D_{Skip\_on} > D_{Skip\_off}$ holds only if $D_{NonROI\_skip} \gg D_{NF}(\rho_{unit} - \rho_1' - \rho_2' - \rho_3')$ because generally the following expression holds:

$$\alpha D_{RF}(\rho_1) + (1-\alpha)D_{NF}(\rho_2) + \alpha D_{RF}(\rho_{unit} - \rho_1 - \rho_2) < \alpha D_{RF}(\rho_1') + (1-\alpha)D_{NF}(\rho_2') + \alpha D_{RF}(\rho_3')$$

Figure 26:
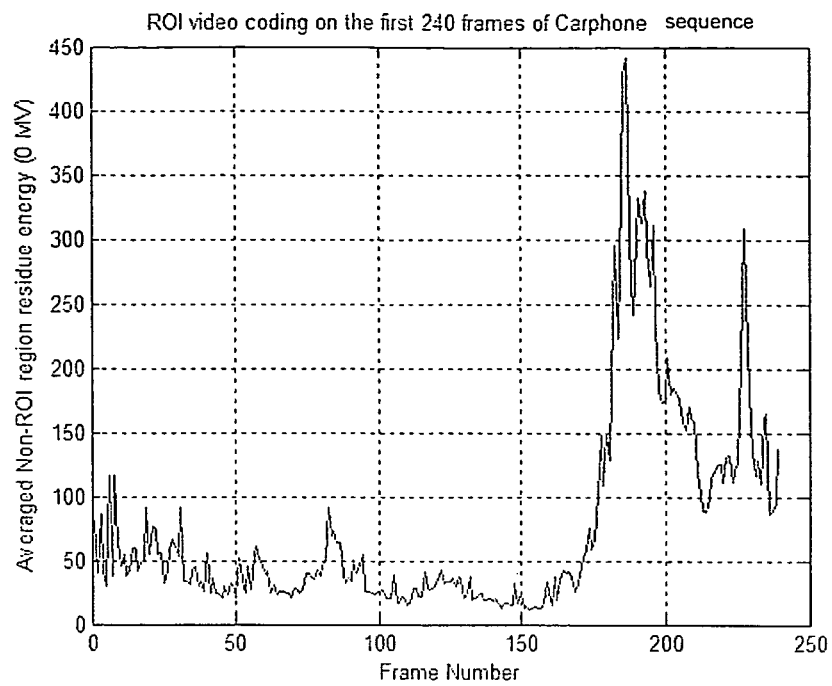
FIG. 26 is a graph illustrating distortion caused by non-ROI skipping over an exemplary video sequence.

This observation is verified to be true from the statistics of $D_{NonROI\_skip}$ for the Carphone video test sequence as shown in FIG. 26. FIG. 26 is a graph illustrating distortion caused by background skipping over an exemplary video sequence. In particular, FIG. 26 plots averaged non-ROI region residue energy $D_{NonROI\_skip}$ versus frame number over the first 240 frames of the Carphone video test sequence. From FIG. 26, it is apparent that the $D_{NonROI\_skip}$ values are much larger than others during frames 180-209, which are the frames characterized by a high degree of motion. Hence, whereas non-ROI skipping is generally favorable, it is unfavorable during the high-motion portion presented by frames 180-209.

Based on the observation above, the task of pursuing a criterion for turning the background skipping mode on and off is converted into a task of looking for a threshold for the distortion of $D_{NonROI\_skip}$. If it is assumed that the unit distortion in a video sequence varies in a smooth fashion, which is generally true, then the average value of the most recently processed unit distortion can be used for deriving the distortion threshold. Denoting $\overline{D}_n$ as the mean distortion of the most recent n units, then based on (35) and (36) it is very possible to make $$D_{Skip\_on} > D_{Skip\_off} \text{ if } (1-\alpha)D_{NonROI\_skip} > \frac{\overline{D}_n}{2}$$

holds. In other words, the criterion for switching off non-ROI skipping can be specified as $$D_{NonROI\_skip} > \frac{\overline{D}_n}{2(1-\alpha)}.$$

This criterion can serve as the basis for an adaptive non-ROI skipping algorithm.

The adaptive non-ROI skipping algorithm may substantially conform to the process shown in FIG. 13, and can be further described as follows.

Step 0: Initialize the data, and set $\overline{D}_n = 0$, and skipping mode=ON.

Step 1: Allocate ρ budget for the current unit (group of two successive frames $F_n$ and $F_{n+1}$) using equation (34).

Step 2: Within the current unit, allocate bits for each macroblocks by equation (32). If the skipping mode is ON, then no bits are assigned for the non-ROI for the second frame within the unit.

Step 3: After the distortion for the current unit is obtained, update $\overline{D}_n$ by $\overline{D}_n = (1-\eta)\overline{D}_{n-1} + \eta D_n$, where η is a learning factor and is in a range of [0, 1].

Step 4: Get data for the next unit; if this is the last unit, go to step 6.

Step 5: Calculate the distortion of $D_{NonROI\_skip}$ for the new unit (group of next two frames $F_{n+2}$ and $F_{n+3}$); if $$D_{NonROI\_skip} > \frac{\overline{D}_n}{2(1-\alpha)}$$

then turn the skipping mode OFF; otherwise, turn the skipping mode ON. Return to step 1.

Step 6: Terminate the adaptive skipping algorithm.

Figure 27:
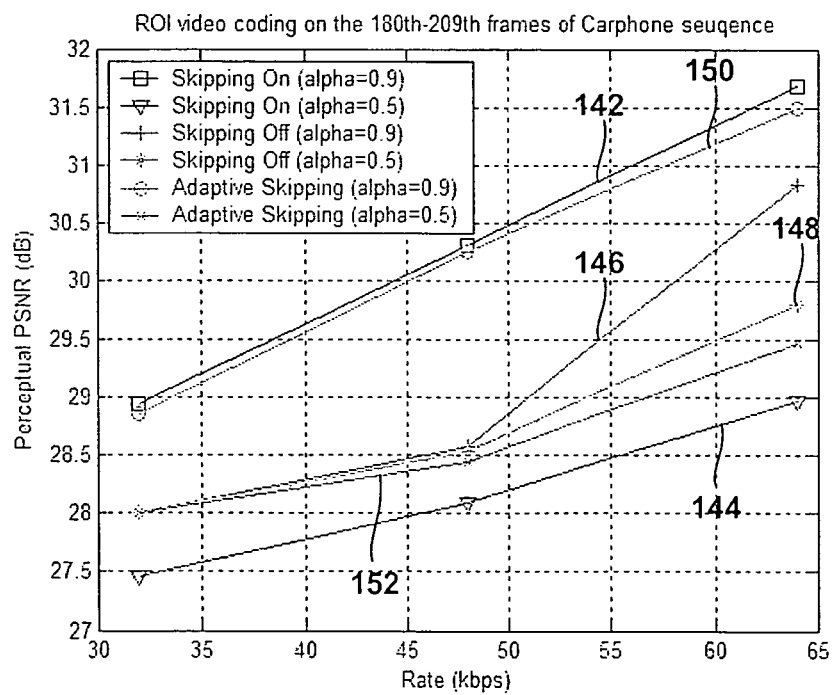
FIG. 27 is a graph comparing overall perceptual quality of ROI encoding techniques using non-ROI skipping, no non-ROI skipping, and adaptive non-ROI skipping.

FIG. 27 is a graph comparing overall perceptual quality of ROI encoding techniques using non-ROI skipping, no non-ROI skipping, and adaptive non-ROI skipping. In each case, a weighted bit allocation algorithm as described herein was applied. FIG. 27 plots perceptual PSNR in decibels versus rate in kilobits per second for ROI video coding of frames 180-209 of the standard Carphone video test sequence. Reference numerals 142 and 144 identify curves representing weighted bit allocation with non-ROI skipping ON and user preference factor α=0.9 and 0.5, respectively. Reference numerals 146 and 148 identify curves representing weighted bit allocation with non-ROI skipping OFF and user preference factor α=0.9 and 0.5, respectively. Reference numerals 150 and 152 identify curves representing weighted bit allocation with adaptive non-ROI skipping and user preference factors α=0.9 and 0.5, respectively. In this evaluation, the value η was set to η=0.25. The results in FIG. 27 show that the result of the adaptive non-ROI skipping approach is very close to the best solutions for various values of α.

FIGS. 28-33 show additional experimental results for ROI coding techniques that apply weighted bit allocation techniques as described in this disclosure. FIGS. 28-32 represent application of various ROI coding techniques to the standard Carphone video test sequence. For FIGS. 28-32, the user preference factor α used in the weighted bit allocation approaches ("Proposed approach" and "Weighted bit allocation") was set at 0.9. The "Proposed approach" label refers to weighted bit allocation with non-ROI skipping. The "Weighted bit allocation" label refers to weighted bit allocation without non-ROI skipping.

Figure 28:
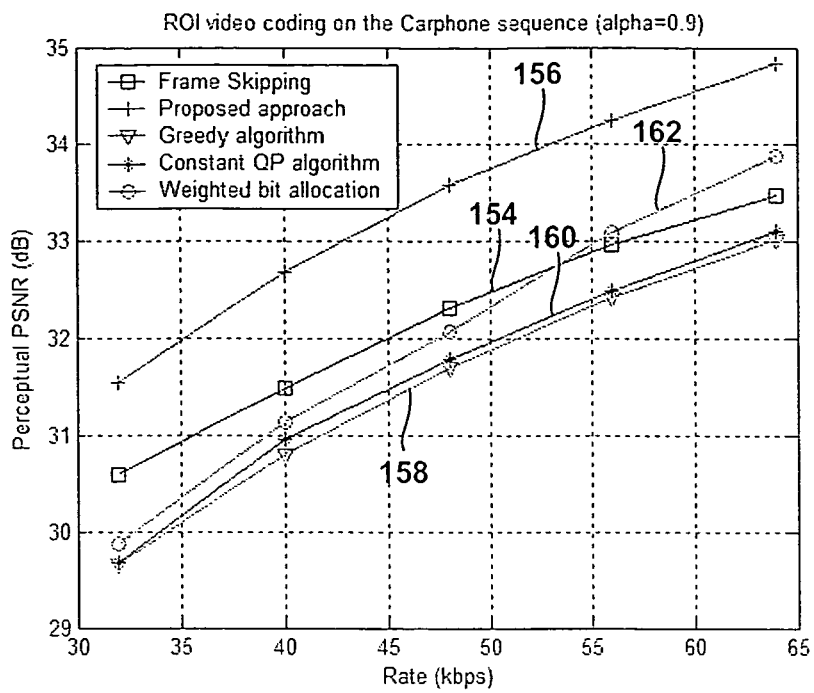
FIG. 28 is a graph comparing overall perceptual quality of ROI encoding techniques using various bit allocation techniques for an exemplary video sequence over a range of encoding rates.

FIG. 28 is a graph comparing overall perceptual quality of ROI encoding techniques using various bit allocation techniques, and plots perceptual PSNR versus rate. In FIG. 28, reference numerals 154, 156, 158, 160 and 162 identify curves representing application of a frame skipping approach, the weighted bit allocation approach with non-ROI skipping, a greedy algorithm, a constant QP algorithm, and the weighted bit allocation approach without non-ROI skipping, respectively.

Figure 29:
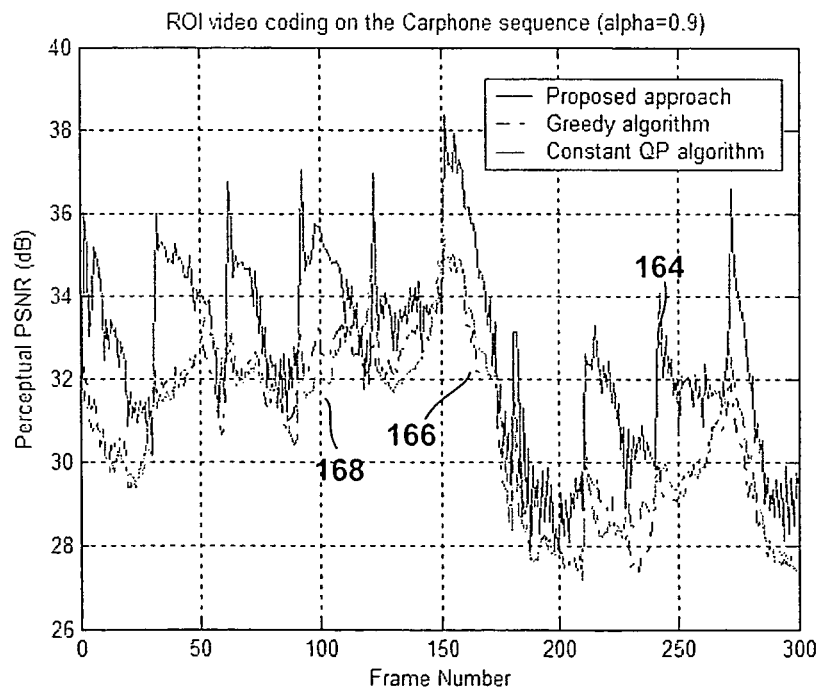
FIG. 29 is a graph comparing overall perceptual quality of ROI encoding techniques using various bit allocation techniques at an encoding rate of 40 kilobits per second (kps).

FIG. 29 is a graph comparing overall perceptual quality of ROI encoding techniques using various bit allocation techniques at an encoding rate of 40 kilobits per second (kps). In particular, FIG. 29 plots perceptual PSNR versus frame number for weighted bit allocation with non-ROI skipping, the greedy algorithm, and a constant QP algorithm.

Figure 30:
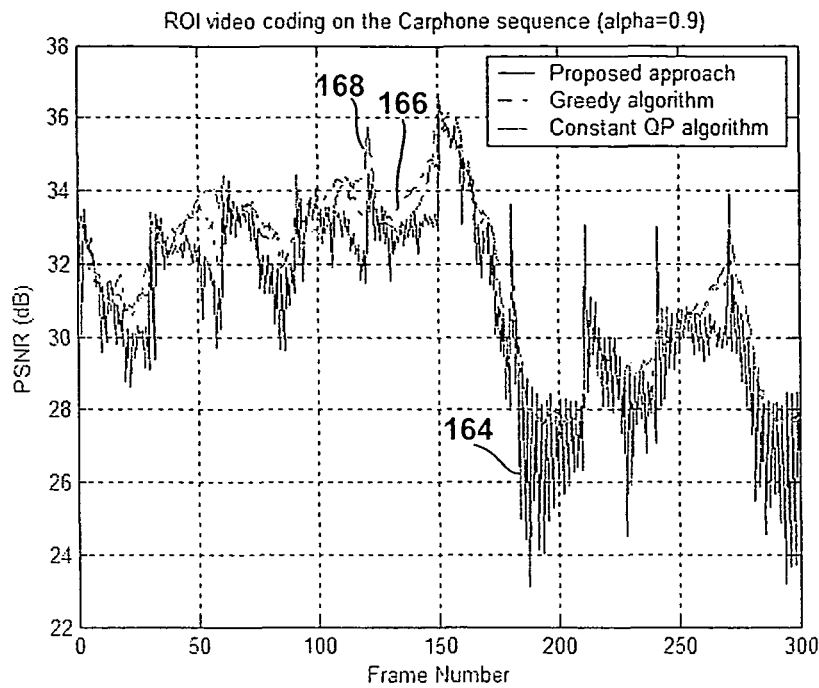
FIG. 30 is a graph comparing overall video fidelity of ROI encoding techniques using various bit allocation techniques at an encoding rate of 40 kilobits per second (kps).
Figure 31:
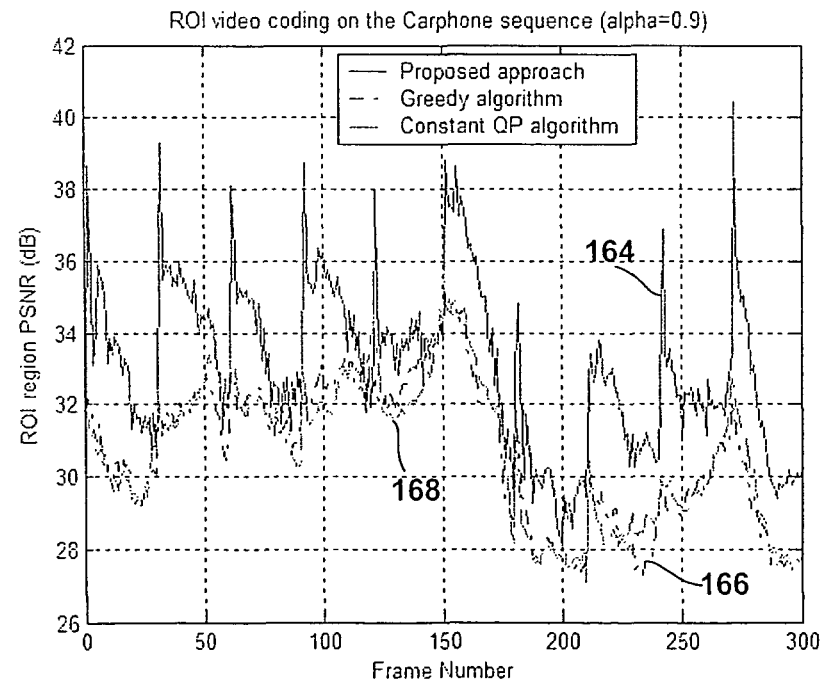
FIG. 31 is a graph comparing ROI video fidelity of ROI encoding techniques using various bit allocation techniques at an encoding rate of 40 kilobits per second (kps).
Figure 32:
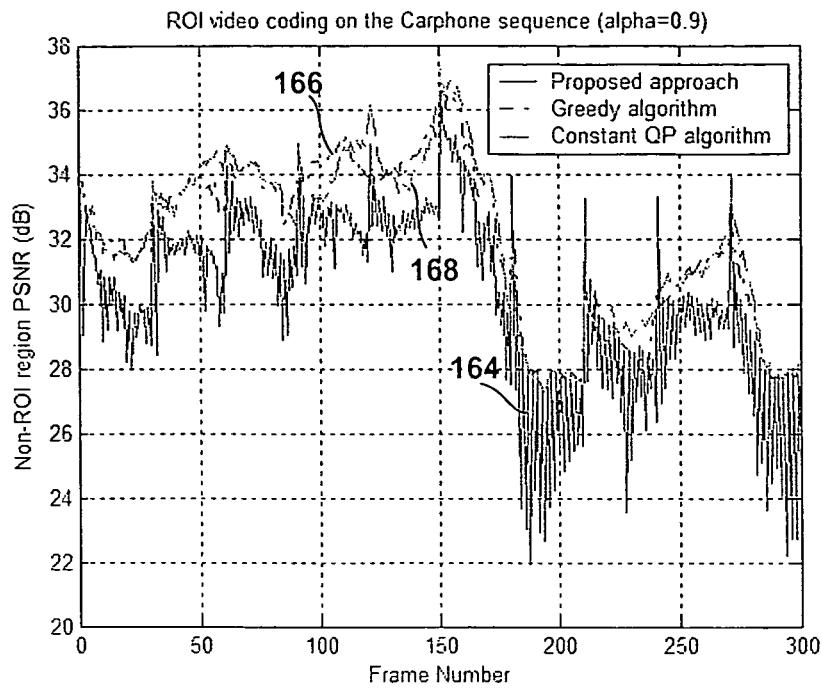
FIG. 32 is a graph comparing non-ROI video fidelity of ROI encoding techniques using various bit allocation techniques at an encoding rate of 40 kilobits per second (kps).

FIG. 30 is a graph comparing overall video fidelity of ROI encoding techniques using various bit allocation techniques at an encoding rate of 40 kilobits per second (kps), and plots PSNR versus frame number. FIG. 31 is a graph comparing ROI video fidelity of ROI encoding techniques using various bit allocation techniques at an encoding rate of 40 kilobits per second (kps), and plots PSNR in the ROI versus frame number. FIG. 32 is a graph comparing non-ROI video fidelity of ROI encoding techniques using various bit allocation techniques at an encoding rate of 40 kilobits per second (kps), and plots non-ROI PSNR versus frame number.

In FIGS. 29-32, weighted bit allocation with non-ROI skipping is indicated by reference numeral 164, the greedy algorithm is indicated by reference numeral 166, and a constant QP algorithm is indicated by reference numeral 168. The constant QP algorithm is a frame-level only rate control algorithm in which all MBs in a frame are assigned an identical quantizer. The greedy algorithm has been described above, and operates at the MB-level. The frame skipping algorithm applies standard frame skipping to avoid encoding the contents of every other frame on an alternating basis, and skips both ROI and non-ROI areas. Weighted bit allocation without non-ROI skipping and weighted bit allocation with adaptive frame skipping ("Proposed approach") have been described above.

FIG. 28 shows that the proposed approach outperformed all other approaches in the entire bitrate range and that the performance gain is up to 2 dB. In FIGS. 29-32, frame-level details of the proposed approach, greedy algorithm and constant QP algorithm are demonstrated.

Figure 33:
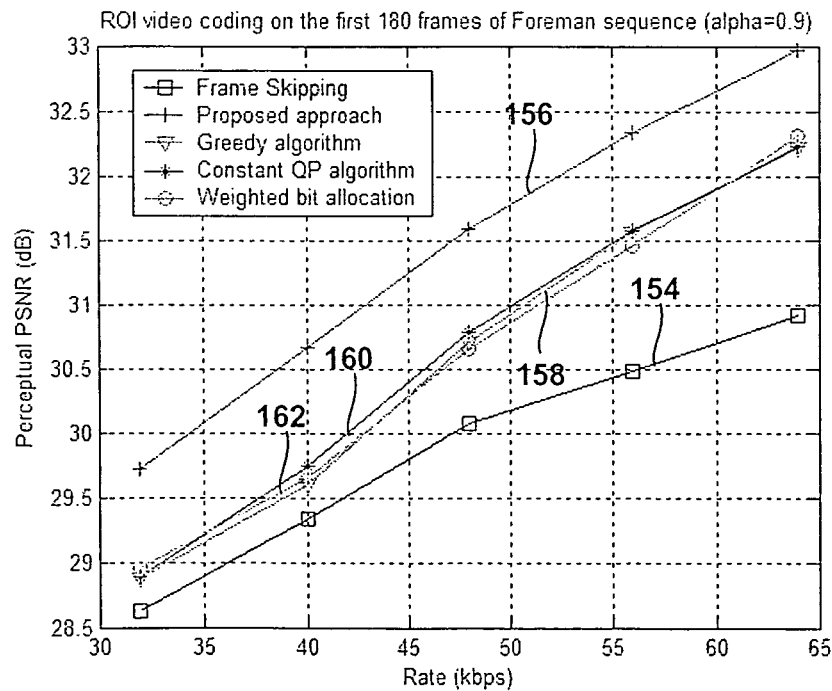
FIG. 33 is a graph comparing overall perceptual quality of ROI encoding techniques using various bit allocation techniques for another exemplary video sequence over a range of encoding rates.

FIG. 33 is a graph comparing overall perceptual quality of ROI encoding techniques using various bit allocation techniques for another exemplary video sequence over a range of encoding rates. In particular, FIG. 33 plots perceptual PSNR versus rate over the first 180 frames of the standard Foreman video test sequence. In FIG. 33, reference numerals 154, 156, 158, 160 and 162 identify curves representing application of a frame skipping approach, the weighted bit allocation approach with non-ROI skipping, a greedy algorithm, a constant QP algorithm, and the weighted bit allocation approach without non-ROI skipping, respectively.

As shown in FIG. 33, the frame skipping approach does not perform as well as in the Carphone sequence, because the face of the Foreman sequence contains much larger motion compared with the Carphone sequence. As a result, frame skipping misses an excessive amount of ROI information in the Foreman sequence, resulting in unsatisfactory performance. Notably, the propose approach of weighted bit allocation with adaptive non-ROI skipping performs very well for the Foreman sequence, as demonstrated by FIG. 33.

In this disclosure, various techniques have been described to support ROI coding for video telephony or video streaming applications, especially when presented with very low bit rate requirements, e.g., in wireless video telephony. The disclosure presents two different optimized weighted bit allocation schemes in the ρ-domain for ROI video coding. The disclosure also presents adaptive non-ROI ("background") skipping approach that can work jointly with the weighted bit allocation models to achieve better performance. In addition, this disclosure presents a video quality metric for measuring the quality of ROI video. The ROI quality metric can be used to guide the optimized bit allocation techniques to produce better subjective visual quality by jointly considering user preference in the ROI, video fidelity, spatial perceptual quality and temporal perceptual quality. The ROI quality metric enables user interaction to bias the coding parameters to fulfill subjective perceptual quality requirements.

The techniques described herein may be implemented in hardware, software, firmware, or any combination thereof. If implemented in software, the techniques may be realized in part by a computer readable medium comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. In some embodiments, the functionality described herein may be provided within dedicated software modules or hardware units configured for encoding and decoding, or incorporated in a combined video encoder-decoder (CODEC).

Various embodiments have been described. These and other embodiments are within the scope of the following claims.

The invention claimed is:

1. A method comprising:
grouping successive video frames into a frame unit;
encoding, by a video encoder, regions of interest within the respective frames in the frame unit, wherein encoding includes allocating rho domain values to macroblocks within the frame based on a frame budget and a weighting between macroblocks within the region of interest and macroblocks within areas of the video frame that are not within the region of interest, wherein the weighting is based at least in part on video fidelity of a preceding frame, perceptual quality of the preceding frame, and user preference in the region of interest, wherein the perceptual quality includes a temporal quality value and a spatial quality value for the preceding frame; and
selectively skipping encoding of areas that are not within a respective region of interest for at least one of the frames in the frame unit based on a distortion value of a region outside a region of interest of a preceding frame unit, wherein the preceding frame unit comprises two or more video frames that precede the successive video frames of the frame unit.

2. The method of claim 1, wherein the temporal quality value includes a first temporal quality value for the region of interest, and a second temporal quality value for areas of the video frame that are not within the region of interest.

3. The method of claim 1, wherein the spatial quality value includes a first spatial quality value for the region of interest, and a second spatial quality value for areas of the video frame that are not within the region of interest.

4. The method of claim 1, wherein the spatial quality value is based at least in part on presence of blocking artifacts in the preceding frame, and wherein the temporal quality value is based at least in part on presence of temporal flicker artifacts in the preceding frame.

5. The method of claim 1, wherein allocating rho domain values includes allocating the rho domain values based on an indication of whether encoding of the areas that are not within the region of interest will be skipped.

6. A device comprising:
a region-of-interest mapper that generates a definition of regions of interests within video frames;
a video encoder that encodes the video frames;
a bit allocation module that allocates rho domain values to macroblocks within the frame based on a frame budget and a weighting between macroblocks within the region of interest and macroblocks within areas of the video frame that are not within the region of interest; and
a skipping module that groups successive frames into a frame unit, directs the video encoder to encode regions of interest within the respective frames in the frame unit, and selectively directs the video encoder to skip encoding of areas that are not within a respective region of interest for at least one of the frames in the frame unit based on a distortion value of a region outside of a region of interest of a preceding frame unit, wherein the preceding frame unit comprises two or more video frames that precede the successive video frames of the frame unit,
wherein the video encoder encodes macroblocks within the video frames based on the rho domain values, wherein the weighting is based at least in part on video fidelity of a preceding frame, perceptual quality of the preceding frame, and user interest in the region of interest, and wherein the perceptual quality includes a temporal quality value and a spatial quality value for the preceding frame.

7. The device of claim 6, wherein the temporal quality value includes a first temporal quality value for the region of interest, and a second temporal quality value for areas of the video frame that are not within the region of interest.

8. The device of claim 7, further comprising a bit allocation module that allocates rho domain values to macroblocks within the frame based on an indication of whether encoding of the areas that are not within the region of interest will be skipped.

9. The device of claim 7, further comprising a wireless transmitter that transmits the encoded video frame via a wireless communication channel, wherein the device is configured to support mobile video telephony.

10. The device of claim 6, wherein the spatial quality value includes a first spatial quality value for the region of interest, and a second spatial quality value for areas of the video frame that are not within the region of interest.

11. The device of claim 6, wherein the spatial quality value is based at least in part on presence of blocking artifacts in the preceding frame, and wherein the temporal quality value is based at least in part on presence of temporal flicker artifacts in the preceding frame.

12. A non-transitory computer-readable medium comprising instructions to cause a processor to:
group successive video frames into a frame unit;
encode regions of interest within the respective frames in the frame unit; and
selectively skip encoding of areas that are not within a respective region of interest for at least one of the frames in the frame unit based on a distortion value of a region outside of a region of interest of a preceding frame unit, wherein the preceding frame unit comprises two or more video frames that precede the successive video frames of the frame unit,
wherein the instructions that cause a processor to encode regions of interest include instructions to cause a processor to
allocate rho domain values to macroblocks within the frame based on a frame budget and a weighting between macroblocks within the region of interest and macroblocks within areas of the video frame that are not within the region of interest, wherein the weighting is based at least in part on video fidelity of a preceding frame, perceptual quality of the preceding frame, and user interest in the region of interest, and wherein the perceptual quality includes a temporal quality value and a spatial quality value for the preceding frame.

13. The computer-readable medium of claim 12, wherein the temporal quality value includes a first temporal quality value for the region of interest, and a second temporal quality value for areas of the video frame that are not within the region of interest.

14. The computer-readable medium of claim 12, wherein the spatial quality value includes a first spatial quality value for the region of interest, and a second spatial quality value for areas of the video frame that are not within the region of interest.

15. The computer-readable medium of claim 12, wherein the spatial quality value is based at least in part on presence of blocking artifacts in the preceding frame, and wherein the temporal quality value is based at least in part on presence of temporal flicker artifacts in the preceding frame.

16. The computer-readable medium of claim 12, further comprising instructions to cause the processor to allocate the rho domain values based on an indication of whether encoding of the areas that are not within the region of interest will be skipped.

17. An apparatus for encoding video signals, the apparatus comprising:
means for storing video frames;
means for processing video frames configured to:
group successive video frames into a frame unit;
encode regions of interest within the respective frames in the frame unit, wherein encoding regions includes allocating rho domain values to macroblocks within the frame based on a frame budget and a weighting between macroblocks within the region of interest and macroblocks within areas of the video frame that are not within the region of interest, wherein the weighting is based at least in part on video fidelity of a preceding frame, perceptual quality of the preceding frame, and user interest in the region of interest, and wherein the perceptual quality includes a temporal quality value and a spatial quality value for the preceding frame; and
selectively skip encoding of areas that are not within a respective region of interest for at least one of the frames in the frame unit based on a distortion value of a region outside of a region of interest of a preceding frame unit, wherein the preceding frame unit comprises two or more video frames that precede the successive video frames of the frame unit.

18. The apparatus of claim 17, wherein the means for processing is further configured to skip encoding the areas that are not within the respective region of interest when the distortion value associated with the preceding frame unit is less than a threshold value.

* * * * *